(12) United States Patent
Harmon et al.

(10) Patent No.: US 12,728,436 B2
(45) Date of Patent: Sep. 8, 2026

(54) SYSTEM AND METHOD FOR AN AGRICULTURAL APPLICATOR

(71) Applicants: CNH Industrial America LLC, New Holland, PA (US); Kansas State University Research Foundation, Manhattan, KS (US)

(72) Inventors: Andrew W. Harmon, Sheboygan, WI (US); Ajay Sharda, Manhattan, KS (US); Jonathan Fabula, San Jose City (PH)

(73) Assignees: CNH Industrial America LLC, New Holland, PA (US); Kansas State University Research Foundation, Manhattan, KS (US)

( * ) Notice: Subject to any disclaimer, the term of this patent is extended or adjusted under 35 U.S.C. 154(b) by 902 days.

(21) Appl. No.: 17/559,326

(22) Filed: Dec. 22, 2021

(65) Prior Publication Data

US 2023/0191436 A1 Jun. 22, 2023

(51) Int. Cl.
*B05B 12/08* (2006.01)
*A01C 23/04* (2006.01)
*A01M 7/00* (2006.01)
*B05B 1/20* (2006.01)
*B05B 12/12* (2006.01)

(52) U.S. Cl.
CPC ......... *B05B 12/084* (2013.01); *A01M 7/0089* (2013.01); *B05B 1/20* (2013.01); *B05B 12/12* (2013.01); *A01C 23/047* (2013.01)

(58) Field of Classification Search
CPC ......... B05B 12/084; B05B 1/20; B05B 12/12; B05B 12/085; A01M 7/0089; A01M 7/0042; A01C 23/047; A01C 23/007
USPC ............................................. 239/11, 159, 69
See application file for complete search history.

(56) References Cited

U.S. PATENT DOCUMENTS

| | | | | |
|---|---|---|---|---|
| 4,411,386 | A | 10/1983 | Disbrow | |
| 5,653,389 | A | 8/1997 | Henderson et al. | |
| 6,726,120 | B2 | 4/2004 | Schaffter et al. | |
| 7,124,964 | B2 | 10/2006 | Bui | |
| 8,844,838 | B2 | 9/2014 | Funseth et al. | |
| 10,173,236 | B2 | 1/2019 | Preheim et al. | |
| 10,244,747 | B2 * | 4/2019 | Leeb | A01M 7/0057 |
| 10,441,965 | B2 | 10/2019 | Feldhaus et al. | |
| 10,739,173 | B2 * | 8/2020 | Conrad | G01F 1/665 |
| 11,235,345 | B2 * | 2/2022 | Feldhaus | A01M 7/0089 |

(Continued)

FOREIGN PATENT DOCUMENTS

| | | | |
|---|---|---|---|
| BR | P10503660 | 10/2017 | |
| CA | 3013670 C * | 12/2020 | A01C 23/007 |

*Primary Examiner* — Arthur O. Hall
*Assistant Examiner* — Kevin Edward Schwartz
(74) *Attorney, Agent, or Firm* — Dority & Manning, P.A.

(57) ABSTRACT

An agricultural system can include a first nozzle assembly positioned along a boom assembly and configured to selectively dispense an agricultural product therefrom. An airflow detection system can be configured to capture data indicative of one or more airflow sources. A computing system can be communicatively coupled to the first nozzle assembly and the airflow detection system. The computing system can be configured to receive, from the airflow detection system, the data associated with the one or more airflow sources and generate a first nozzle vector for the first nozzle assembly based at least in part on the data from the airflow detection system.

15 Claims, 12 Drawing Sheets

(56) References Cited

U.S. PATENT DOCUMENTS

| | | | | |
|---|---|---|---|---|
| 11,925,177 | B2 * | 3/2024 | Bremer | B05B 15/18 |
| 2003/0111546 | A1 * | 6/2003 | Schaffter | A01M 7/0089 239/69 |
| 2004/0069875 | A1 * | 4/2004 | Bui | B05B 1/3006 239/533.2 |
| 2005/0211794 | A1 | 9/2005 | Clark et al. | |
| 2009/0242657 | A1 | 10/2009 | Peterson | |
| 2013/0103211 | A1 * | 4/2013 | Peterson | A01B 79/005 700/284 |
| 2013/0161413 | A1 * | 6/2013 | Funseth | B05B 1/3026 239/164 |
| 2015/0306618 | A1 | 10/2015 | Petter et al. | |
| 2016/0368011 | A1 * | 12/2016 | Feldhaus | B05B 12/124 |
| 2017/0027103 | A1 * | 2/2017 | Grotelueschen | A01M 7/0057 |
| 2017/0348718 | A1 * | 12/2017 | Preheim | A01C 23/007 |
| 2018/0111135 | A1 | 4/2018 | Zito, Jr. et al. | |
| 2019/0150357 | A1 * | 5/2019 | Wu | H04N 7/188 |
| 2020/0023398 | A1 * | 1/2020 | Feldhaus | B05B 13/005 |
| 2020/0122174 | A1 | 4/2020 | Thurow et al. | |
| 2021/0127567 | A1 * | 5/2021 | Loukili | A01M 7/0042 |
| 2021/0176977 | A1 | 6/2021 | Bremer et al. | |
| 2021/0182978 | A1 * | 6/2021 | Nissing | A01B 79/005 |
| 2021/0368772 | A1 | 12/2021 | Stanhope et al. | |

* cited by examiner 10
20
42
46
54
56
58
60
62

SYSTEM AND METHOD FOR AN AGRICULTURAL APPLICATOR

FIELD

The present disclosure generally relates to agricultural implements and, more particularly, to systems and methods for monitoring a spray operation, such as by monitoring one or more airflow sources during the spray operation.

BACKGROUND

Various types of work vehicles utilize applicators (e.g., sprayers, floaters, etc.) to deliver an agricultural product to a ground surface of a field. The agricultural product may be in the form of a solution or mixture, with a carrier (such as water) being mixed with one or more active ingredients (such as an herbicide, fertilizer, fungicide, a pesticide, or another product).

The applicators may be pulled as an implement or self-propelled and can include a tank, a pump, a boom assembly, and a plurality of nozzles carried by the boom assembly at spaced locations. The boom assembly can include a pair of boom arms, with each boom arm extending to either side of the applicator when in an unfolded state. Each boom arm may include multiple boom sections, each with a number of spray nozzles (also sometimes referred to as spray tips).

The spray nozzles on the boom assembly disperse the agricultural product carried by the applicator onto a field. During a spray operation, however, various factors may affect a quality of application of the agricultural product to the field. Accordingly, an improved system and method for monitoring the quality of application of the agricultural product to the field would be welcomed in the technology.

BRIEF DESCRIPTION

Aspects and advantages of the technology will be set forth in part in the following description, or may be obvious from the description, or may be learned through practice of the technology.

In some aspects, the present subject matter is directed to an agricultural system that includes a first nozzle assembly positioned along a boom assembly and configured to selectively dispense an agricultural product therefrom. An airflow detection system is configured to capture data indicative of one or more airflow sources. A computing system is communicatively coupled to the first nozzle assembly and the airflow detection system. The computing system is configured to receive, from the airflow detection system, the data associated with the one or more airflow sources and generate a first nozzle assembly vector for the first nozzle assembly based at least in part on the data from the airflow detection system.

In some aspects, the present subject matter is directed to a method for an agricultural application operation. The method includes receiving, through an airflow detection system, data indicative of one or more airflow sources. The method further includes determining, with a computing system, a first nozzle assembly vector associated with a first nozzle assembly supported on a boom assembly based on the data from the airflow detection system. The method also includes determining, with the computing system, a second nozzle assembly vector associated with a second nozzle assembly supported on the boom assembly based on the data from the airflow detection system. Lastly, the method includes generating, with the computing system, an output based at least in part on the first nozzle assembly vector or the second nozzle assembly vector.

In some aspects, the present subject matter is directed to a method for an agricultural application operation. The method includes receiving, through an airflow detection system, data indicative of one or more airflow sources. The method further includes determining, with a computing system, a nozzle assembly vector of a nozzle assembly based on the one or more airflow sources. Lastly, the method includes generating, with the computing system, an output based at least in part on the nozzle assembly vector.

These and other features, aspects, and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
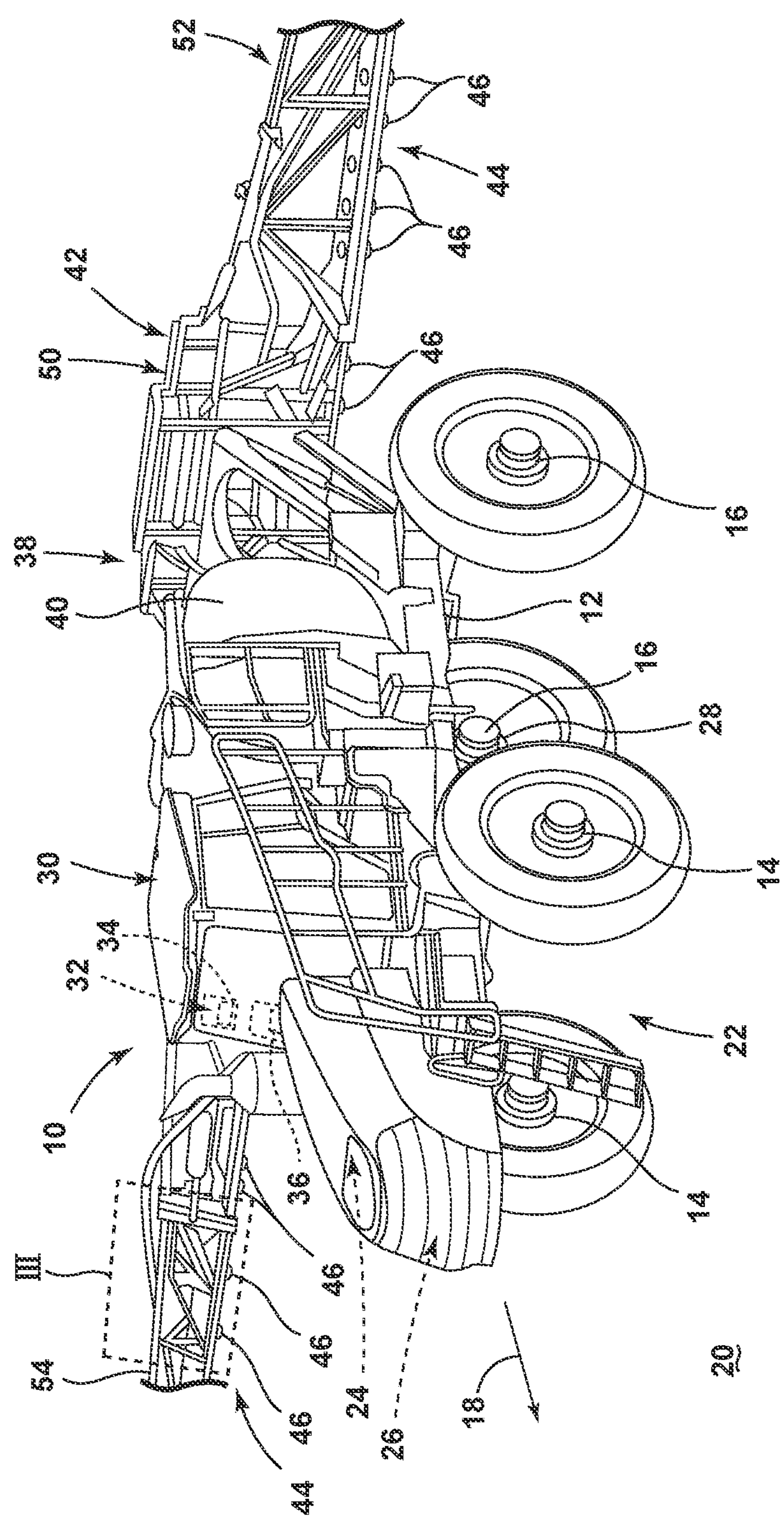
FIG. 1 illustrates a perspective view of an agricultural work vehicle in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the disclosure, one or more examples of which are illustrated in the drawings. Each example is provided by way of explanation of the discourse, not limitation of the disclosure. In fact, it will be apparent to those skilled in the art that various modifications and variations can be made in the present disclosure without departing from the scope or spirit of the disclosure. For instance, features illustrated or described as part can be used with another embodiment to yield a still further embodiment. Thus, it is intended that the present disclosure covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to an agricultural product within a fluid circuit. For example, "upstream" refers to the direction from which an agricultural product flows, and "downstream" refers to the direction to which the agricultural product moves. The term "selectively" refers to a component's ability to operate in various states (e.g., an ON state and an OFF state) based on manual and/or automatic control of the component.

Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

In general, the present subject matter is directed to a system for various agricultural operations. In some instances, an agricultural system can include one or more nozzle assemblies positioned along a boom assembly and configured to selectively dispense an agricultural product therefrom. An airflow detection system is configured to capture data indicative of one or more airflow sources. A computing system is communicatively coupled to the first nozzle assembly and the airflow detection system.

During operation, each nozzle assembly may move along a unique path and/or experience varied airflow relative to one or more other nozzle assemblies. The varied airflow may affect a spray quality of application of the agricultural product to the field. The spray quality can be defined as a predefined application rate/range that estimates whether a spray operation has led to appropriate coverage of a field, or a portion of the field, by the agricultural product. As such, the system may monitor a nozzle airflow vector at one or more nozzle assemblies, and/or each nozzle assembly, which may be used, at least in part, to determine a spray quality index. When the spray quality index deviates from a defined range, the system may determine whether airflow relative to one or more nozzles is a contributing factor of the deviation in the spray quality index. If the system determines that airflow is at least partially causing the deviation in the spray quality index, a flow rate (and/or any other operating parameter) of the nozzle assemblies may be varied.

Figure 2:
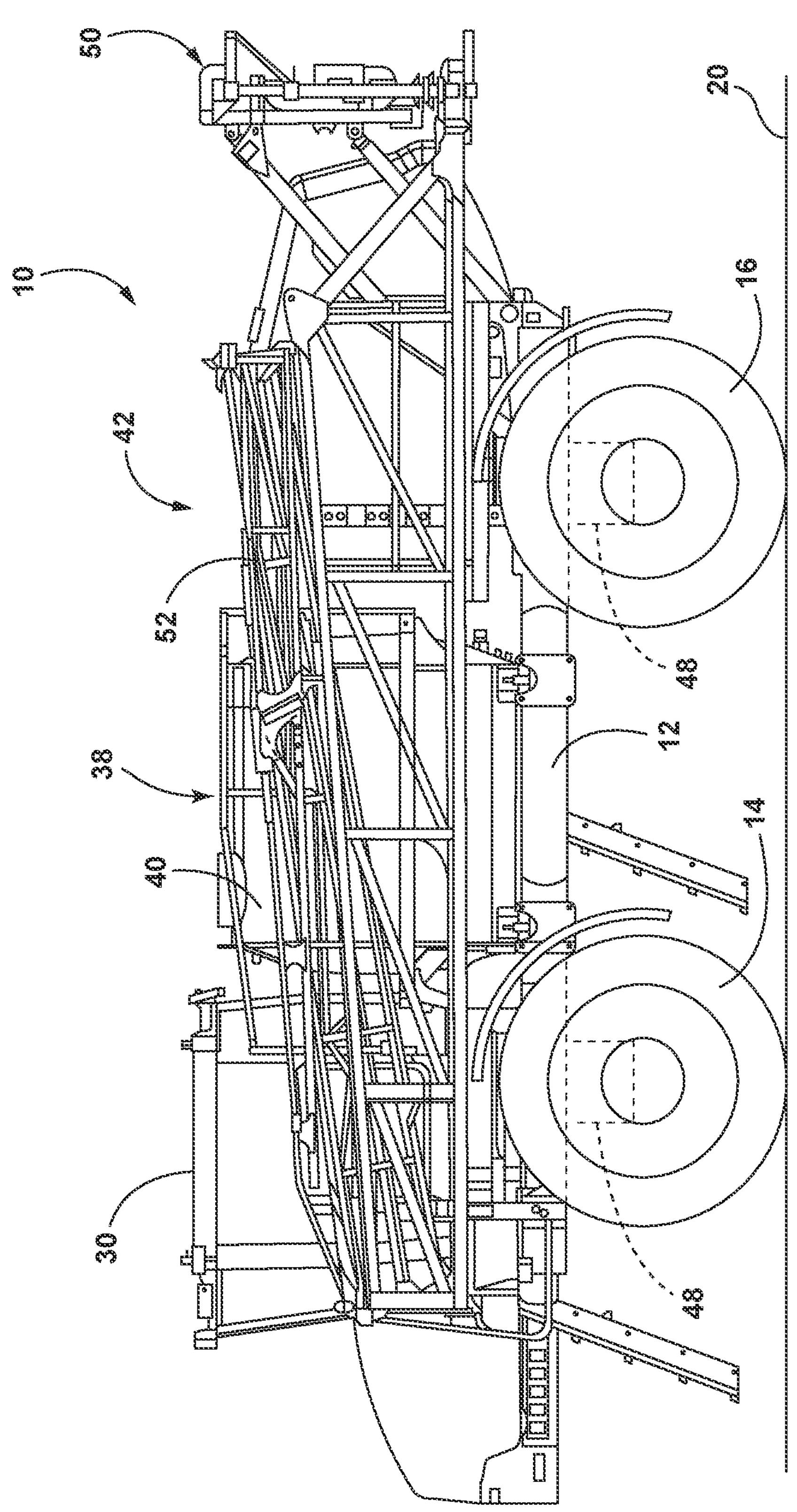
FIG. 2 illustrates a side view of the work vehicle in accordance with aspects of the present subject matter.

Referring now to FIGS. 1 and 2, a work vehicle 10 is generally illustrated as a self-propelled agricultural applicator. However, in alternate embodiments, the work vehicle 10 may be configured as any other suitable type of work vehicle 10 configured to perform agricultural application operations, such as a tractor or other vehicle configured to haul or tow an application implement.

In various embodiments, the work vehicle 10 may include a chassis 12 configured to support or couple to a plurality of components. For example, front and rear wheels 14, 16 may be coupled to the chassis 12. The wheels 14, 16 may be configured to support the work vehicle 10 relative to a ground surface 20 and move the work vehicle 10 in a direction of travel (e.g., as indicated by arrow 18 in FIG. 1) across the ground surface 20. In this regard, the work vehicle 10 may include a powertrain control system 22 that includes a power plant 24, such as an engine, a motor, or a hybrid engine-motor combination, a transmission or hydraulic propel system 26 configured to transmit power from the engine to the wheels 14, 16, and/or a brake system 28.

The chassis 12 may also support a cab 30, or any other form of user's station, for permitting the user to control the operation of the work vehicle 10. For instance, as shown in FIG. 1, the work vehicle 10 may include a user interface 32 having a display 34 for providing messages and/or alerts to the user and/or for allowing the user to interface with the vehicle's controller through one or more user input devices 36 (e.g., levers, pedals, control panels, buttons, and/or the like).

The chassis 12 may also support a product system 38 that includes one or more tanks 40, such as a rinse tank and/or a product tank, and a boom assembly 42 mounted to the chassis 12. The product tank is generally configured to store or hold an agricultural product, such as a pesticide, a fungicide, a rodenticide, a fertilizer, a nutrient, and/or the like. The agricultural product is conveyed from the product tank through plumbing components, such as interconnected pieces of tubing, for release onto the underlying ground surface 20 (e.g., plants and/or soil) through an application system 44 that can include one or more nozzle assemblies 46 mounted on the boom assembly 42. In some embodiments, to improve the agricultural product application quality and/or user comfort, the vehicle 10 can be equipped with a passive, semi-active, or active vehicle suspension 48 to dampen movement of the vehicle 10 and/or the boom assembly 42 while operating the vehicle 10 and/or the boom assembly 42.

As shown in FIGS. 1 and 2, the boom assembly 42 can include a frame 50 that supports first and second boom arms 52, 54, which may be orientated in a cantilevered nature. The first and second boom arms 52, 54 are generally movable between an operative or unfolded position (FIG. 1) and an inoperative or folded position (FIG. 2). When distributing the product, the first and/or second boom arm 52, 54 extends laterally outward from the work vehicle 10 to cover swaths of the underlying ground surface 20, as illustrated in FIG. 1. However, to facilitate transport, each boom arm 52, 54 of the boom assembly 42 may be independently folded forwardly or rearwardly into the inoperative position, thereby reducing the overall width of the vehicle 10, or in some examples, the overall width of a towable implement when the applicator is configured to be towed behind the work vehicle 10.

Figure 3:
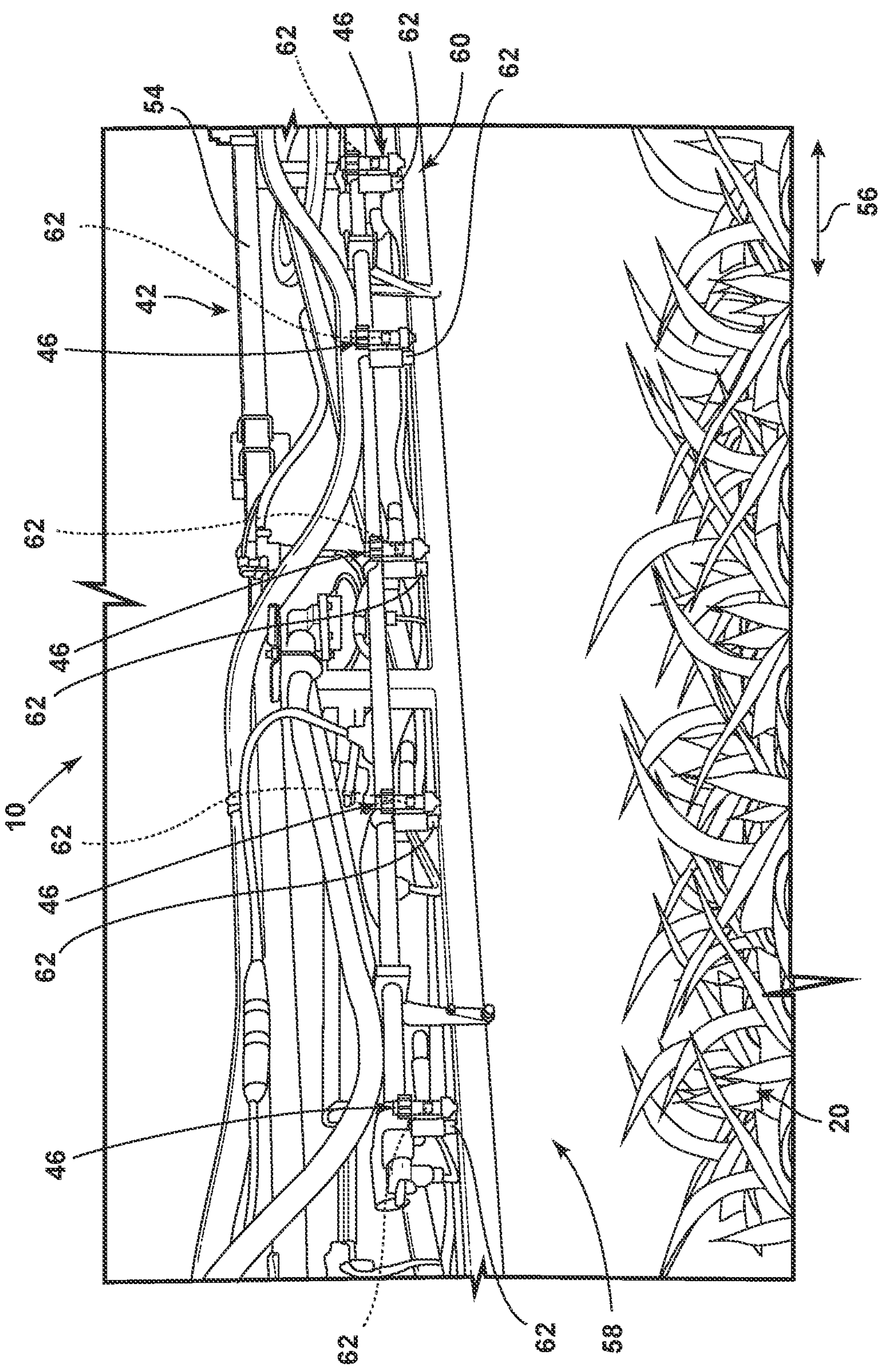
FIG. 3 is an enhanced view of section III of FIG. 1 illustrating a rear view of a portion of a boom assembly in accordance with aspects of the present subject matter.
Figure 4:
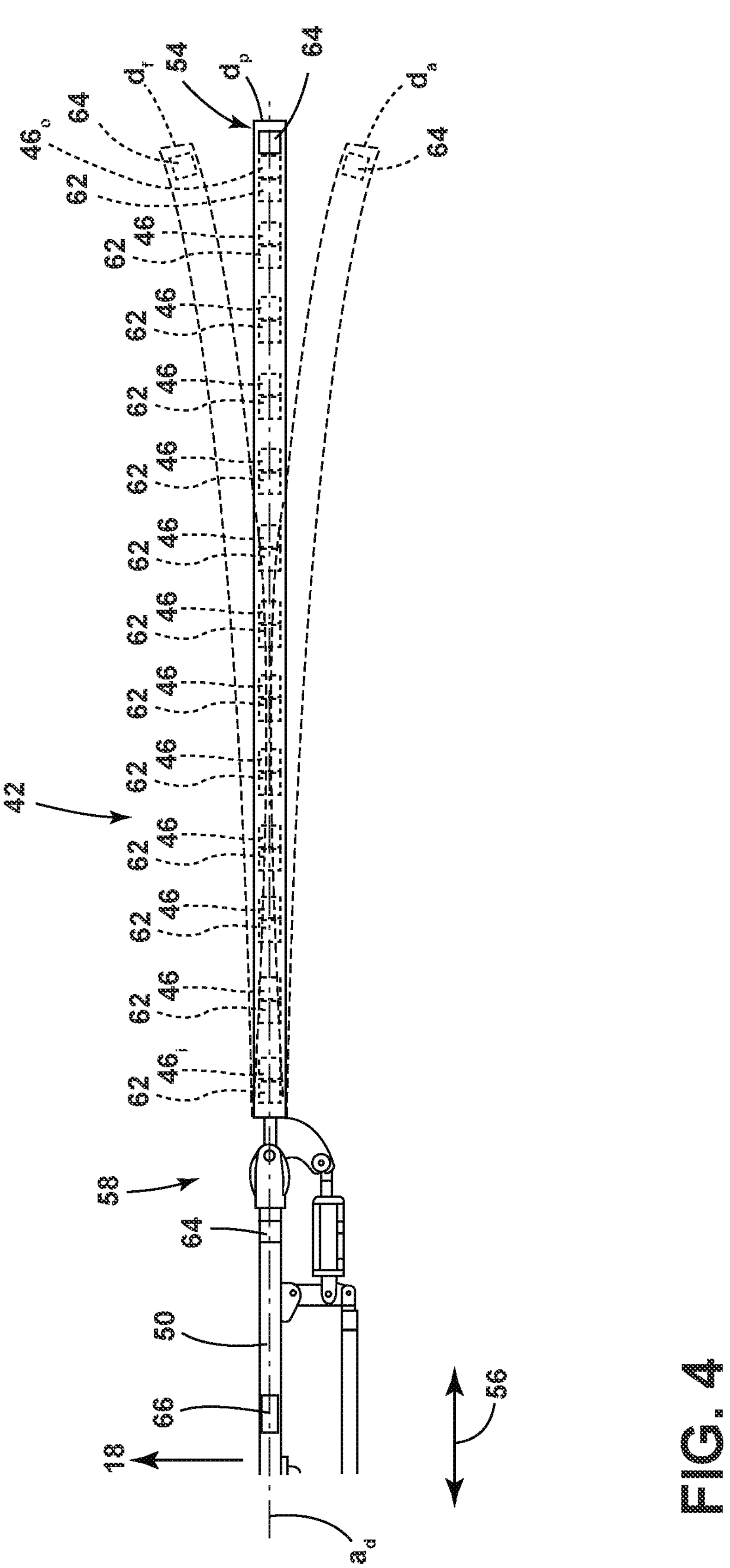
FIG. 4 is a top schematic view of a portion of a boom assembly in accordance with aspects of the present subject matter.

Referring to FIGS. 3 and 4, the boom assembly 42 may be configured to support a plurality of nozzle assemblies 46. Each nozzle assembly 46 may be configured to dispense an agricultural product stored within the tank 40 (FIG. 1) onto the underlying ground surface 20. In several embodiments, the nozzle assemblies 46 may be mounted on and/or coupled to the first and/or second boom arms 52, 54 of the boom assembly 42, with the nozzle assemblies 46 being spaced apart from each other along a lateral direction 56. Furthermore, fluid conduits may fluidly couple the nozzle assemblies 46 to the tank 40. In this respect, as the work vehicle 10 travels across the ground surface 20 in the direction of travel 18 to perform a spraying operation thereon, the agricultural product moves from the tank 40 through the fluid conduit to each of the nozzle assemblies 46. The nozzles may, in turn, dispense or otherwise spray a fan of the agricultural product onto the underlying ground surface 20. For example, the nozzle assemblies 46 may include flat fan nozzles configured to dispense a flat fan of the agricultural product. However, in alternative embodiments, the nozzle assemblies 46 may include any other suitable types of nozzles, such as dual pattern nozzles and/or hollow cone nozzles.

With further reference to FIGS. 3 and 4, during a spray operation, various spray quality parameters may affect a spray quality of application of the agricultural product to the ground surface 20, which can be computed into a spray quality index in which the spray quality index represents a metric indicative of a spray operation coverage of a portion of a ground surface 20. In some instances, the spray quality index may be used to determine whether the agricultural product was applied to various portions of the ground surface 20 within a defined range and/or misapplied to various portions of the ground surface 20 by deviating from the defined range.

In several embodiments, the one or more spray quality parameters that may affect the spray quality can include at least one of an airflow at each nozzle assembly 46, a nozzle tip size and style, which agricultural product is being applied, an incorrect agricultural product application rate, inclement weather as determined by meeting one or more criteria, an agricultural product application rate or pressure deviating from a predefined range, boom assembly movement (e.g., jounce) deviating from a movement range, a vehicle deviating from a predefined speed, a vehicle acceleration/deceleration deviating from a predefined range, a turning radius deviating from predefined criteria, and/or any other variable.

To monitor at least an airflow at each nozzle assembly 46, the work vehicle 10 may include an airflow detection system 58, which may determine a nozzle airflow vector at each nozzle assembly 46. The nozzle airflow vector may be indicative of an airflow direction and magnitude at each nozzle assembly 46. In turn, one or more operating parameters of the work vehicle 10 and/or the respective nozzle assembly 46 may be adjusted, either independently or with one or more other nozzle assemblies 46 based at least in part on the nozzle airflow vector of a nozzle assembly 46. The airflow vector at each nozzle assembly 46 may be a summation of various factors that affect the airspeed at the respective nozzle assembly 46. For example, the various factors may include an environmental wind/conditions, the airflow generated by the movement of the work vehicle 10, the airflow generated by the movement of the boom arms 52, 54 relative to the chassis 12 of the work vehicle 10, etc.

Referring further to FIG. 3, in various embodiments, the airflow detection system 58 may include a nozzle sensor system 60 that can include one or more nozzle sensors 62 installed on the vehicle 10 and/or the boom assembly 42. In several instances, as illustrated in FIG. 3, a nozzle sensor 62 may be associated with a respective nozzle assembly 46. Each nozzle sensor 62 may be configured to capture data indicative of various nozzle conditions. For example, the nozzle sensor 62 may be configured to detect a nozzle airflow direction and speed proximate to the respective nozzle assembly 46. In such examples, the one or more nozzle sensors 62 may correspond to one or more airspeed sensors. In general, the airspeed sensors may be configured to capture data indicative of the airspeed of the air flowing past each airspeed sensor. The airspeed data may, in turn, be correlated to the proximate nozzle assembly 46 to determine a nozzle airflow vector for the proximate nozzle assembly 46. In various examples, the airspeed sensors may correspond to a pitot tube, an anemometer, and/or any other practicable device. As shown, the airspeed sensors are mounted in a generally adjacent position to respective nozzle assemblies 46. However, in alternative embodiments, the airspeed sensors may be installed on the work vehicle 10 at any other suitable location. Moreover, in further embodiments, the nozzle sensors 62 may correspond to any other suitable sensors capable of capturing data indicative of the airflow proximate to one or more nozzle assemblies 46 of the work vehicle 10.

Additionally or alternatively, the nozzle sensor 62 may be configured to capture data indicative of an orientation or position of the boom assembly 42 relative to the ground surface 20 and/or data associated with one or more application variables that may affect the spray quality index. In some examples, the nozzle sensor 62 may correspond to one or more imaging devices. Each imaging device may be configured to capture image data related to one or more spray fans emitted from the nozzle assemblies 46. The imaging device may correspond to any suitable sensing device configured to detect or capture images or other image-like data associated with the spray fans present within its field of view. For example, in several embodiments, the imaging device may correspond to a suitable camera configured to capture three-dimensional images of the spray fans present within its field of view. For instance, in a particular embodiment, the imaging device may correspond to a stereographic camera having two or more lenses with a separate image sensor for each lens to allow the camera to capture stereographic or three-dimensional images. However, in alternative embodiments, the imaging device may correspond to any other suitable sensing device configured to capture image or image-like data, such as a monocular camera, a LIDAR sensor, and/or a RADAR sensor.

In other examples, the nozzle sensors 62 may correspond to one or more pressure sensors. In general, the pressure sensors may be configured to capture data indicative of the pressure of the agricultural product being supplied to the nozzle assemblies 46. As such, the pressure sensors may be provided in fluid communication with one of the product system 38 and/or the application system 44. For example, the pressure sensor may correspond to a diaphragm pressure sensor, a piston pressure sensor, a strain gauge-based pressure sensor, an electromagnetic pressure sensor, and/or the like.

With further reference to FIG. 4, the airflow detection system 58 may additionally or alternatively include one or more position sensors 64 and/or a weather station 66. In various embodiments, the one or more position sensors 64 may be configured to determine a curvature of the boom arm 54. In turn, a position and movement direction of each nozzle assembly 46 may be determined.

In addition, the weather station 66 may be configured to capture data indicative of a wind speed and direction at a defined position on the work vehicle 10. The mobile weather station 66 can contain any sensor that may be found on a stationary weather station 66 that monitors one or more weather criteria, such as temperature, wind speed, wind direction, relative humidity, barometric pressure, cloud cover, and trends thereof. With the position and the movement direction of each nozzle assembly 46 known and a wind direction at the defined position, a nozzle airflow vector may be generated for each nozzle assembly 46.

During operation, various forces may be placed on the boom assembly 42 causing the boom assembly 42 and, consequently, the nozzle assemblies 46 positioned along the boom assembly 42, to be deflected or repositioned relative to the frame 50 and/or the work vehicle 10. For instance, a portion of the boom assembly 42 may be deflected from an assumed or a default position $d_p$ due to high dynamic forces encountered when the work vehicle 10 is turned, accelerated, or decelerated. In addition, terrain variations and weather variances may also cause deflection of the boom assembly 42. Further, a portion of the boom assembly 42 may come in contact with an object, thereby leading to deflection of the boom assembly 42.

In embodiments that utilize a boom arm 54 that is supported by the frame 50 in a cantilevered orientation (or any other non-uniform orientation), such as the one illustrated in FIG. 4, an outer nozzle assembly $\mathbf{46}_o$ will have a greater deflection magnitude from its default position $d_p$ than an inner nozzle assembly $\mathbf{46}_i$. Once the deflective force is overcome and/or no longer present, the boom arm 54 will move back towards its default position $d_p$. In some embodiments, the movement of the boom arm 54 may generally occur as harmonic oscillations across the default axis $a_d$ such that the boom arm 54 may move from a position at least partially aft of the default axis $a_d$ to the default position $d_p$ and then to a position at least partially fore of the default position $d_p$ and so on. During the oscillations, an acceleration or speed of an inner nozzle assembly $\mathbf{46}_i$ may be less than the outer nozzle assembly $\mathbf{46}_o$ due to the varied deflection magnitudes along the boom arm 54. In addition, once the boom assembly 42 is deflected, a path of movement of the inner nozzle assembly $\mathbf{46}_i$ may be non-parallel to a path of movement of the outer nozzle assembly $\mathbf{46}_o$.

In some embodiments, a boom speed and/or boom acceleration of the boom arm 54 may be calculated based on the detected and/or calculated position of various portions of the boom arm 54 based on data from the position sensor 64 at known periods to define a boom deflection model. The boom deflection model may map a deflection of each nozzle assembly 46 from a default axis $a_d$, a nozzle assembly speed or acceleration, and/or a path of movement of each nozzle assembly 46 relative to the frame 50. In various embodiments, the boom deflection model may be determined through various geometric equations, lookup tables (LUTs), and/or any other method to determine a position, a speed, and/or an acceleration of each nozzle assembly 46.

Due to the varied nozzle assembly speed and/or path of the movement of each nozzle assembly 46, an airflow speed and/or direction at each nozzle assembly 46 may be varied relative to one another. As such, the boom deflection model, the speed of the vehicle, and the data from the weather station 66 may be used to determine a nozzle airflow vector for each nozzle assembly 46. In turn, an operating parameter of the work vehicle 10 and/or one or more nozzle assemblies 46 may be altered relative to one another in order to maintain a defined spray quality index and/or for any other purpose.

Figure 5:
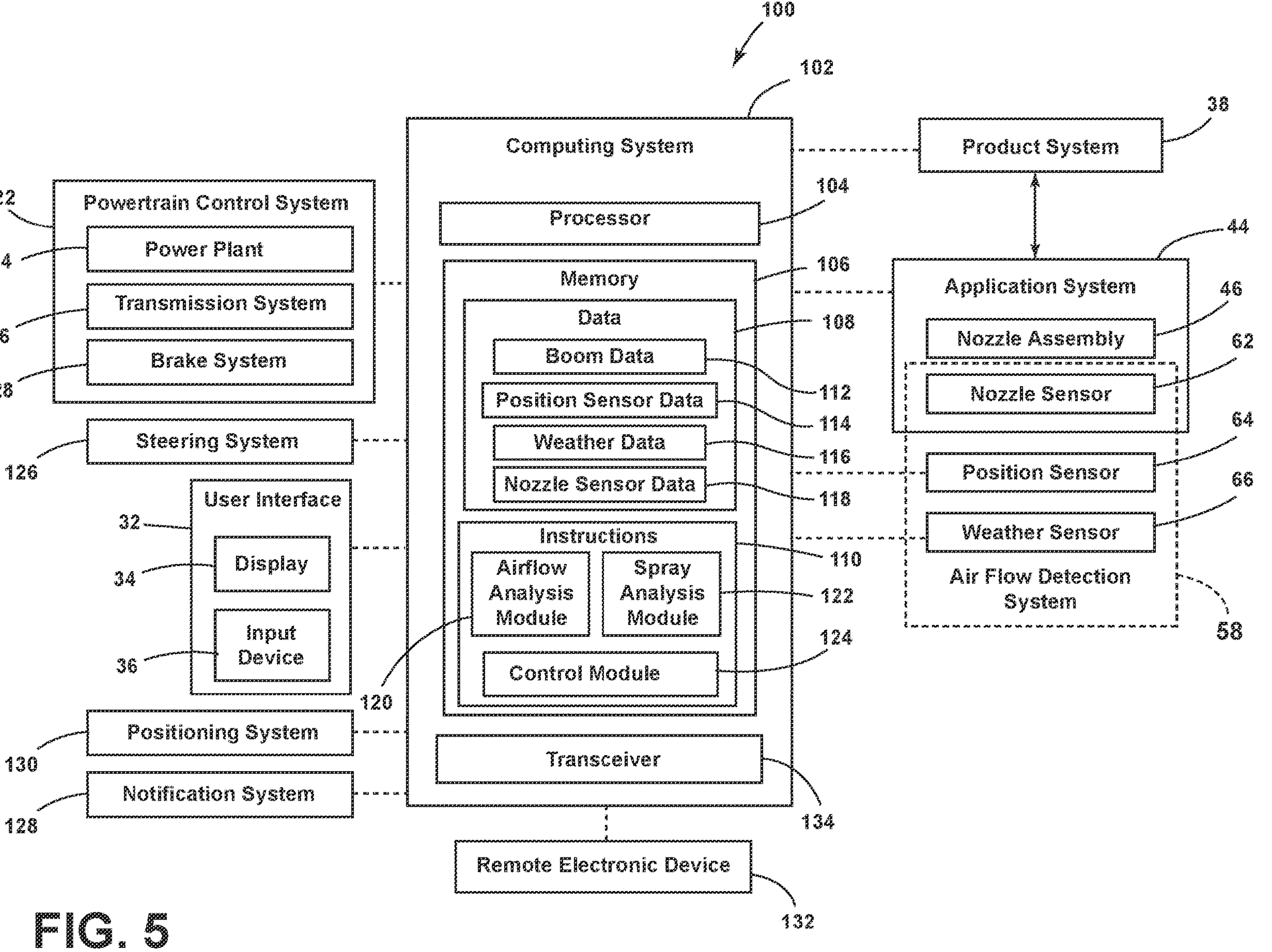
FIG. 5 illustrates a block diagram of components of the agricultural applicator system in accordance with aspects of the present subject matter.

Referring now to FIG. 5, a schematic view of a system 100 for operating the work vehicle 10 is illustrated in accordance with aspects of the present subject matter. In general, the system 100 will be described with reference to the work vehicle 10 described above with reference to FIGS. 1-4. However, it should be appreciated by those of ordinary skill in the art that the disclosed system 100 may generally be utilized with agricultural machines having any other suitable machine configuration. Additionally, it should be appreciated that, for purposes of illustration, communicative links, or electrical couplings of the system 100 shown in FIG. 5 are indicated by dashed lines.

As shown in FIG. 5, the system 100 may include a computing system 102 operably coupled with the agricultural product application system 44 that may be configured to dispense an agricultural product from the product system 38 to the ground surface 20 (FIG. 1) through one or more nozzle assemblies 46 that may be positioned at least partially along the boom assembly 42 (FIG. 1). In several embodiments, the nozzle assemblies 46 may include a nozzle and a valve for activating the respective nozzle to perform a spray operation. The valves can include restrictive orifices, regulators, and/or the like to regulate the flow of agricultural product from the product system 38 that is emitted from each nozzle. In various embodiments, the valves may be configured as electronically controlled valves that are controlled by a Pulse Width Modulation (PWM) signal for altering the application rate of the agricultural product. In various instances, the valves of each respective the nozzle assembly 46 may be electronically controlled based at least in part on a determined airflow vector at the respective nozzle assembly 46.

In general, the computing system 102 may comprise any suitable processor-based device, such as a computing device or any suitable combination of computing devices. Thus, in several embodiments, the computing system 102 may include one or more processors 104 and associated memory 106 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 106 of the computing system 102 may generally comprise memory elements including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 106 may generally be configured to store information accessible to the processor 104, including data 108 that can be retrieved, manipulated, created, and/or stored by the processor 104 and instructions 110 that can be executed by the processor 104, when implemented by the processor 104, configure the computing system 102 to perform various computer-implemented functions, such as one or more aspects of the image processing algorithms and/or related methods described herein. In addition, the computing system 102 may also include various other suitable components, such as a communications circuit or module, one or more input/output channels, a data/control bus, and/or the like.

In various embodiments, the computing system 102 may correspond to an existing controller of the agricultural work vehicle 10, or the computing system 102 may correspond to a separate processing device. For instance, in some embodiments, the computing system 102 may form all or part of a separate plug-in module or computing device that is installed relative to the work vehicle 10 or boom assembly 42 to allow for the disclosed system 100 and method to be implemented without requiring additional software to be uploaded onto existing control devices of the work vehicle 10 or the boom assembly 42.

In several embodiments, the data 108 may be information received and/or generated by the computing system 102 that is stored in one or more databases. For instance, as shown in FIG. 5, the memory 106 may include a boom database 112, which may be configured to store data and/or algorithms related to one or more boom assemblies that may be used by the system 100. For example, the boom database 112 may be configured to receive inputs related to and/or detect various boom characteristics, such as a length of the boom, a number of nozzle assemblies 46 along the boom, and/or any other data. In addition, the boom database 112 may include various algorithms, LUTs, etc. that are associated with each boom based on the boom characteristics.

In addition, the memory 106 may include a position sensor database 114 for storing position data received from the one or more position sensors 64. For example, the position sensors 64 may be configured to continuously or periodically capture data associated with a position of the boom assembly 42. In such embodiments, the data transmitted to the computing system 102 from the position sensors 64 may be stored within the position sensor database 114 for subsequent processing and/or analysis.

The memory 106 may also include a weather database 116 for storing weather data that may be received from the weather station 66. The weather data may include at least a wind speed and/or a direction in a defined position. In such embodiments, the data transmitted to the computing system 102 from the weather station 66 may be stored within the weather database 116 for subsequent processing and/or analysis.

The memory 106 may further include a nozzle sensor database 118 for storing data received from the one or more nozzle sensors 62. For example, the nozzle sensors 62 may be configured to continuously or periodically capture data associated with a wind speed and/or direction proximate to one or more nozzle assemblies 46. In such embodiments, the data transmitted to the computing system 102 from the nozzle sensors 62 may be stored within the nozzle sensor database 118 for subsequent processing and/or analysis. In addition, in some instances, the nozzle sensor database 118 may also store data related to one or more variables that may affect the spray quality index.

In several embodiments, the instructions 110 stored within the memory 106 of the computing system 102 may be executed by the processor 104 to implement an airflow analysis module 120, an application analysis module 122, and/or a control module 124.

In general, the airflow analysis module 120 may be configured to process/analyze the data 112 to determine a nozzle airflow vector for one or more nozzle assemblies 46 based on a combination of one or more sources of airflow, which may include a boom deflection airflow, a work vehicle movement airflow, an environmental airflow, etc. For instance, the airflow analysis module 120 may utilize the data received from the one or more position sensors 64 and the boom characteristics data to estimate or determine a boom deflection model. In several embodiments, the airflow analysis module 120 may be configured to execute one or more algorithms to determine a magnitude of deflection and/or a direction of movement to generate the boom deflection model.

The airflow analysis module 120 may also utilize the boom data to determine the known positions of the nozzle assemblies 46 along the boom assembly 42. With the boom deflection model, which can include a path of movement for the boom assembly 42 and the known positions of the nozzle assemblies 46, the airflow analysis module 120 may generate a speed and direction of movement of each nozzle assembly 46. Based on the determined movement of each nozzle assembly 46, the boom deflection airflow, which may include a direction and speed of airflow caused by the boom movement relative to chassis 12 of the work vehicle 10.

In addition, the airflow analysis module 120 may use data from the powertrain control system 22 and/or a steering system 126 of the work vehicle 10 to determine the work vehicle movement airflow, which may include a direction and speed of airflow caused by the movement of the vehicle relative to the ground surface 20.

Still further, the airflow analysis module 120 may receive the weather data to determine the environmental airflow, which may include a direction and speed of airflow caused by environment or ambient factors. In some instances, based on the location of the weather station 66, various airflow sources may be detected and combined as a single airflow. For example, the environmental airflow and the work vehicle movement airflow may be detected as a common airflow in some instances.

Based on a speed and direction of each of the airflow sources, which may include the boom deflection airflow, the work vehicle movement airflow, the environmental airflow, and/or any other airflow source, the airflow analysis module 120 may determine a nozzle airflow vector for any of the nozzle assemblies 46. As the nozzle assemblies 46 may move at varying speeds and/or directions relative to one another, a first movement airflow vector associated with a first nozzle assembly 46 may be varied from a second movement airflow vector associated with a second nozzle assembly 46.

Additionally or alternatively, the airflow analysis module 120 may receive the nozzle sensor data to determine a nozzle airflow vector for the one or more nozzle assemblies 46 or each nozzle assembly 46. In various examples, the nozzle sensor data may be correlated to each respective nozzle assembly 46 such that the data may be used to determine each airflow vector. In some instances, as the nozzle sensor data is captured proximate to the respective nozzle assembly 46, each of the airflow sources may be captured in culmination with one another.

With further reference to FIG. 5, the application analysis module 122 may be configured to analyze the initial or raw sensor data captured by the nozzle sensor 62, the position sensor 64, and/or the weather station 66 to allow the computing system 102 to estimate the spray quality index of one or more sections of the ground surface 20. For instance, the application analysis module 122 may be configured to execute one or more suitable data processing techniques or algorithms that allow the computing system 102 to accurately and efficiently analyze the sensor data, such as by applying corrections or adjustments to the data based on the sensor type, sensor resolution, and/or other parameters associated with the sensors 82, the position sensor 64, and/or the weather station 66, by filtering the data to remove outliers, by implementing sub-routines or intermediate calculations to estimate the spray quality index based on the one or more application variables, and/or by performing any other desired data processing-related techniques or algorithms.

The active control module 124 may provide instructions for various components communicatively coupled with the computing system 102 based on the results of the airflow analysis module 120 and/or the application analysis module 122. For example, the active control module 124 may provide notifications and/or instructions to the user interface 32, a vehicle notification system 128, and/or a remote electronic device 132. In some examples, the display 34 of the user interface 32 may be capable of displaying information related to the airflow vectors of each respective nozzle assembly 46.

The active control module 124 may also be capable of altering a system or component of the vehicle 10 in response to the spray quality index varying from a defined range. For instance, in some embodiments, the computing system 102 may adjust an agricultural product application system 44 by altering a flow rate of one or more nozzle assemblies 46 based at least in part on the airflow vector associated with the one or more nozzle assemblies 46. Additionally, or alternatively, in some examples, the active control module 124 may alter the operation of the application system 44 to pause or otherwise change the application of the agricultural product in response to determining that a threshold number of airflow vectors exceeds a defined range.

In addition, various other components may be adjusted by the active control module 124 in response to one or more application variables deviating from a defined range or threshold. For example, the computing system 102 may also adjust or alter the powertrain control system 22, the steering system 126, and/or the vehicle suspension 48 when the spray quality index deviates from a defined range.

In some embodiments, the vehicle notification system 128 may prompt visual, auditory, and tactile notifications and/or warnings when one or more airflow vectors exceeds a defined range of magnitudes or directions, the spray quality index deviates from a predefined range, and/or one or more functions of the vehicle 10 or the boom assembly 42 is altered by the computing system 102. For instance, vehicle brake lights and/or vehicle emergency flashers may provide a visual alert. A vehicle horn and/or speaker may provide an audible alert. A haptic device integrated into the cab 30 and/or any other location may provide a tactile alert. Additionally, the computing system 102 and/or the vehicle notification system 128 may communicate with the user interface 32 of the vehicle 10.

In addition to providing the notification to the user, the computing system 102 may additionally store the location of the vehicle 10 at the time of the notification, which may be determined through a positioning system 130. In some embodiments, the positioning system 130 may be configured to determine the location of the work vehicle 10 and/or the boom assembly 42 by using a GPS system, a Galileo positioning system, the Global Navigation satellite system (GLONASS), the BeiDou Satellite Navigation and Positioning system, a dead reckoning system, and/or the like. The stored location may be displayed through a field map to illustrate locations of the field in which an agricultural product may have been applied within a defined range and/or misapplied by deviating from the defined range.

Further, the computing system 102 may communicate via wired and/or wireless communication with one or more remote electronic devices 132 through a transceiver 134. The network may be one or more of various wired or wireless communication mechanisms, including any combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary wireless communication networks include a wireless transceiver (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, providing data communication services.

The electronic device 132 may also include a display for displaying information to a user. For instance, the electronic device 132 may display one or more user interfaces and may be capable of receiving remote user inputs to set a predefined threshold for any of the application variables and/or to input any other information, such as the agricultural product to be used in a spray operation. In addition, the electronic device 132 may provide feedback information, such as visual, audible, and tactile alerts, and/or allow the user to alter or adjust one or more components of the vehicle 10 or the boom assembly 42 through the usage of the remote electronic device 132. It will be appreciated that the electronic device 132 may be any one of a variety of computing devices and may include a processor and memory. For example, the electronic device 132 may be a cell phone, mobile communication device, key fob, wearable device (e.g., fitness band, watch, glasses, jewelry, wallet), apparel (e.g., a tee shirt, gloves, shoes, or other accessories), personal digital assistant, headphones and/or other devices that include capabilities for wireless communications and/or any wired communications protocols.

Although the various control functions and/or actions are generally described herein as being executed by the computing system 102, one or more of such control functions/actions (or portions thereof) may be executed by a separate computing system 102 or may be distributed across two or more computing systems (including, for example, the computing system 102 and a separate computing system). For instance, in some embodiments, the computing system 102 may be configured to acquire data from the nozzle sensors 62 and/or the position sensors 64 for subsequent processing and/or analysis by a separate computing system (e.g., a computing system associated with a remote server). In other embodiments, the computing system 102 may be configured to execute the airflow analysis module 120 and/or the application analysis module 122, while a separate computing system (e.g., a vehicle computing system associated with the agricultural work vehicle 10) may be configured to execute the control module 124 to control the operation of the agricultural work vehicle 10 based on data and/or instructions transmitted from the computing system 102 that are associated with the monitored objects and/or field conditions. Likewise, in some embodiments, the computing system 102 may be configured to acquire data from the nozzle sensors 62 and/or the position sensors 64 for subsequent processing and/or analysis by a separate computing system (e.g., a computing system associated with a remote server). In other embodiments, the computing system 102 may be configured to execute the airflow analysis module 120 to determine a nozzle airflow vector for one or more nozzle assemblies 46, while a separate computing system (e.g., a vehicle computing system associated with the agricultural work vehicle 10) may be configured to execute the control module 124 to control the operation of the agricultural work vehicle 10 based on data and/or instructions transmitted from the computing system 102 that are associated with the boom deflection model.

Referring now to FIGS. 6A-10B, an example is described of first and second nozzle assemblies 46$_i$, 46$_o$ positioned along a boom arm 54 with the boom arm 54 moving from a general default position at a first time $t_1$ (FIGS. 6A and 6B) to an aft position $a_p$ at a second time $t_2$ (FIGS. 7A and 7B), the default position at a third time $t_3$ (FIGS. 8A and 8B), a fore position $f_p$ at a fourth time $t_4$ (FIGS. 9A and 9B), and the default position at a fifth time $t_5$ (FIGS. 10A and 10B) while the work vehicle 10 travels in the direction of travel 18.

As the first nozzle assembly 46$_i$ and the second nozzle assembly 46$_o$ move from the first time $t_1$ to the fifth time $t_5$, each nozzle assembly 46$_i$, 46$_o$ may move along a unique path and/or experience varied airflow relative to one another. The varied airflow may affect a spray quality of the application of the agricultural product to the ground surface 20. As such, the system 100 described herein may monitor a nozzle assembly airflow vector at one or more nozzle assemblies 46$_i$, 46$_o$, and/or each nozzle assembly 46$_i$, 46$_o$, which may be used, at least in part, to determine a spray quality index. When the spray quality index deviates from a defined range, the system 100 may determine whether airflow relative to one or more nozzle assemblies 46$_i$, 46$_o$ is a contributing factor of the deviation in the spray quality index. If the system 100 determines that airflow is at least partially causing the deviation in the spray quality index, a flow rate (and/or any other operating parameter) of the nozzle assemblies 46$_i$, 46$_o$ may be varied.

Figure 6A:
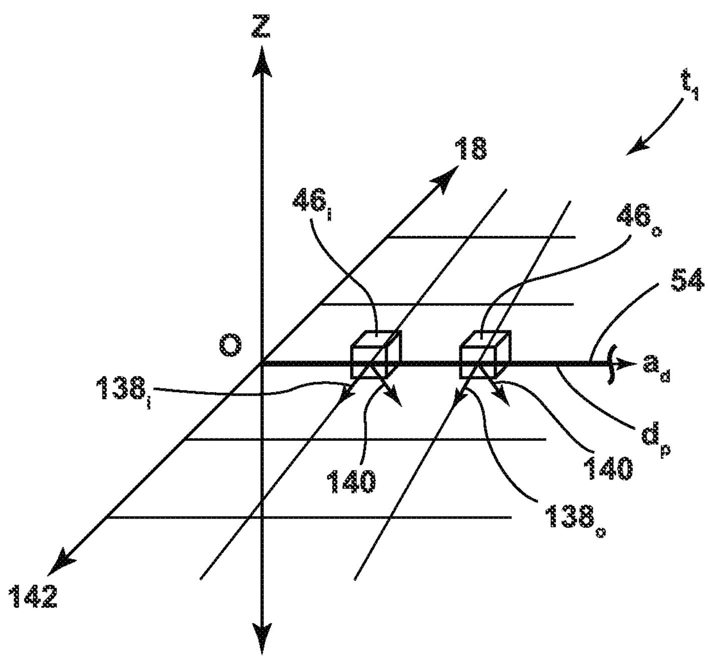
FIG. 6A is a schematic illustration of a first nozzle assembly and a second nozzle assembly positioned along a boom assembly at a first time in accordance with aspects of the present subject matter.
Figure 6B:
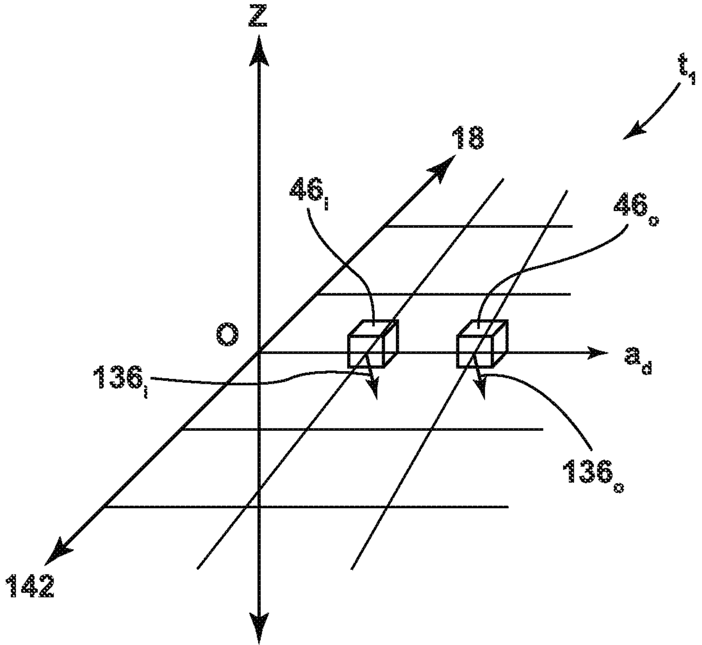
FIG. 6B is a schematic illustration of a first nozzle vector associated with the first nozzle assembly and a second nozzle vector associated with the second nozzle assembly at the first time in accordance with aspects of the present subject matter.

Referring further to FIGS. 6A and 6B, at a first time $t_1$, the work vehicle 10 can move in the direction of travel 18 with the boom arm 54 extending along the default axis $a_d$. In such instances, a first nozzle assembly airflow vector 136$_i$ associated with the first nozzle assembly 46$_i$ and a second nozzle assembly airflow vector 136$_o$ associated with the second nozzle assembly 46$_o$ may be generally equal as the first nozzle assembly 46$_i$ and the second nozzle assembly 46$_o$ experience a generally common movement airflow vectors 138$_i$, 138$_o$ and an environmental airflow vector 140 thereby defining a general similar airflow vector for each nozzle assembly 46$_i$, 46$_o$. The movement airflow vectors 138$_i$, 138$_o$ may be defined as a combination of a boom deflection airflow, which may be caused by movement of the boom arm 54 relative to the chassis 12 of the work vehicle 10, and a work vehicle movement airflow, which may be caused by the movement of the vehicle relative to the ground surface 20, at each nozzle assembly 46$_i$, 46$_o$.

As illustrated in FIG. 6A, the movement airflow vectors 138$_i$, 138$_o$ may be oriented in a direction 142 that is generally opposite to the direction of movement. In addition, the magnitude of the movement airflow vectors 138$_i$, 138$_o$ may be based on the speed of the work vehicle 10 relative to the ground surface 20 as the boom arm 54 is generally stationary relative to the chassis 12 of the work vehicle 10. The environmental airflow vector 140 may be indicative of a speed and direction of airflow generated by environmental factors, which for illustrative purposes is generally equal in direction and magnitude to the other times (e.g., $t_2$, $t_3$, $t_4$, $t_5$) in FIGS. 6A-10B.

With further reference to FIG. 6B, the first nozzle assembly airflow vector 136$_i$ is a combination of the first movement airflow vector 138$_i$ and the environmental airflow vector 140 associated with the first nozzle assembly 46$_i$. Likewise, the second nozzle assembly airflow vector 136$_o$ is a combination of the second movement airflow vector 138$_o$ and the environmental airflow vector 140 associated with the second nozzle assembly 46$_o$.

Figure 7A:
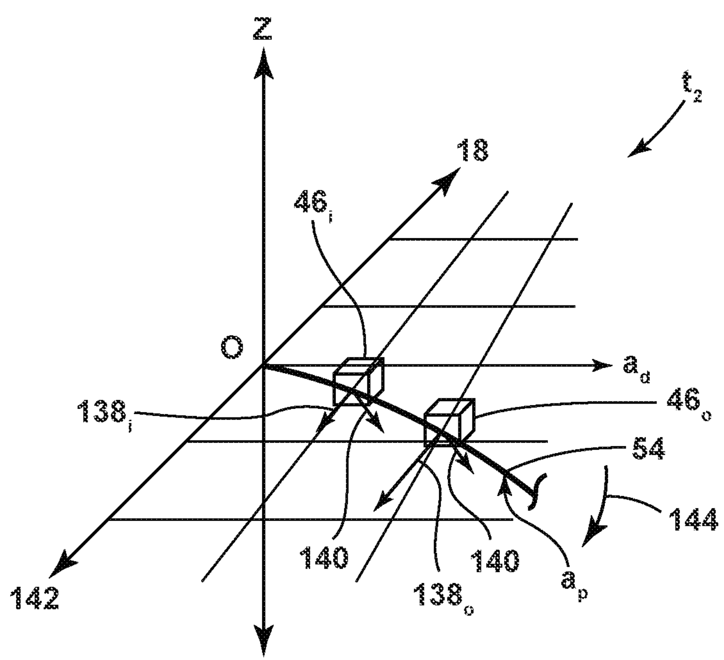
FIG. 7A is a schematic illustration of a first nozzle assembly and a second nozzle assembly positioned along a boom assembly at a second time in accordance with aspects of the present subject matter.
Figure 7B:
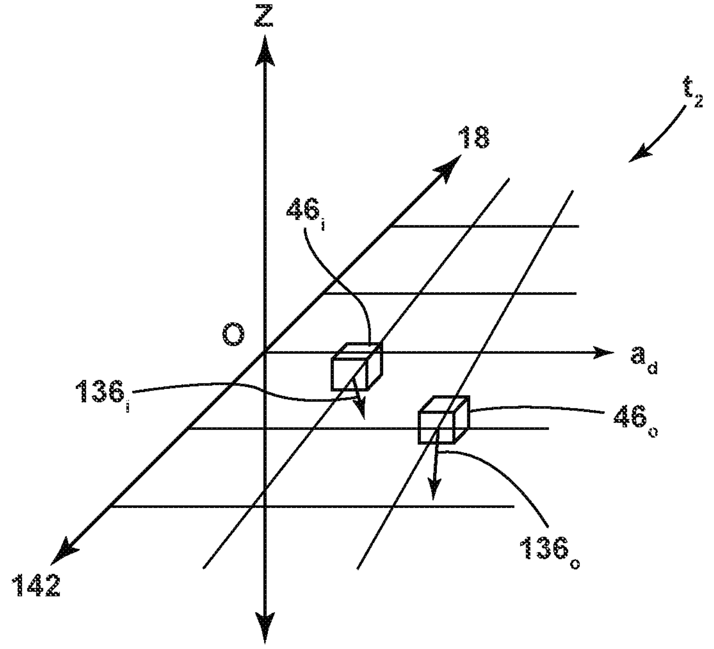
FIG. 7B is a schematic illustration of a first nozzle vector associated with the first nozzle assembly and a second nozzle vector associated with the second nozzle assembly at the second time in accordance with aspects of the present subject matter.

Referring further to FIGS. 7A and 7B, at the second time $t_2$, the work vehicle 10 can move in the direction of travel 18 with the boom arm 54 moving from the default axis $a_d$ to a position aft of the default axis $a_d$ as indicated by arrow 144. In such instances, the first nozzle assembly airflow vector 136$_i$ associated with the first nozzle assembly 46$_i$ may be non-parallel to the second nozzle assembly airflow vector 136$_o$ associated with the second nozzle assembly 46$_o$ due to the deflection of the boom arm 54. As provided herein, due to the second nozzle assembly 46$_o$ being further from the frame 50 of the boom assembly 42, the second nozzle assembly 46$_o$ may deflect a greater magnitude from the default axis $a_d$ than the first nozzle assembly 46$_i$. In addition, as the deflection of the first nozzle assembly 46$_i$ and the second nozzle assembly 46$_o$ occurs in a common amount of time, the second nozzle assembly 46$_o$ can move at a greater speed or acceleration than the first nozzle assembly 46$_i$.

As illustrated in FIG. 7A, the movement airflow vectors 138$_i$, 138$_o$ may be oriented in a direction that is generally offset from the direction of movement of the work vehicle 10 as the boom arm 54 is non-perpendicular to the direction of movement 18 of the work vehicle 10. In addition, the magnitude of the movement airflow vectors 138$_i$, 138$_o$ may be based on the speed of the work vehicle 10 relative to the ground surface 20 and the speed of the nozzle assembly 46$_i$, 46$_o$ relative to the chassis 12 of the work vehicle 10. In some instances, as the boom is deflected in a direction 142 that is opposite to the direction of movement of the work vehicle 10, the movement airflow vectors 138$_i$, 138$_o$ may be a combination of the airflow created by the movement of the work vehicle 10 and the movement of the boom arm 54 in opposing directions. In addition, the environmental airflow vector 140 may be indicative of a speed and direction of airflow generated by environmental factors, which for illustrative purposes is generally equal in direction and magnitude to the other times (e.g., $t_1$, $t_3$, $t_4$, $t_5$) in FIGS.

With further reference to FIG. 7B, the first nozzle assembly airflow vector 136$_i$ is a combination of the first movement airflow vector 138$_i$ and the environmental airflow vector 140 associated with the first nozzle assembly 46$_i$ illustrated in FIG. 7A. Likewise, the second nozzle assembly airflow vector 136$_o$ is a combination of the second movement airflow vector 138$_o$ and the environmental airflow vector 140 associated with the second nozzle assembly 46$_o$ illustrated in FIG. 7A. As illustrated, the first movement airflow vector 138$_i$ may have a direction that is non-parallel to the second movement airflow vector 138$_o$. In addition, due to the varying speeds of the first nozzle assembly 46$_i$ from the second nozzle assembly 46$_o$ relative to the ground surface 20, the magnitude of the first movement airflow vector 138$_i$ may be varied from the magnitude of the second movement airflow vector 138$_o$.

Figure 8A:
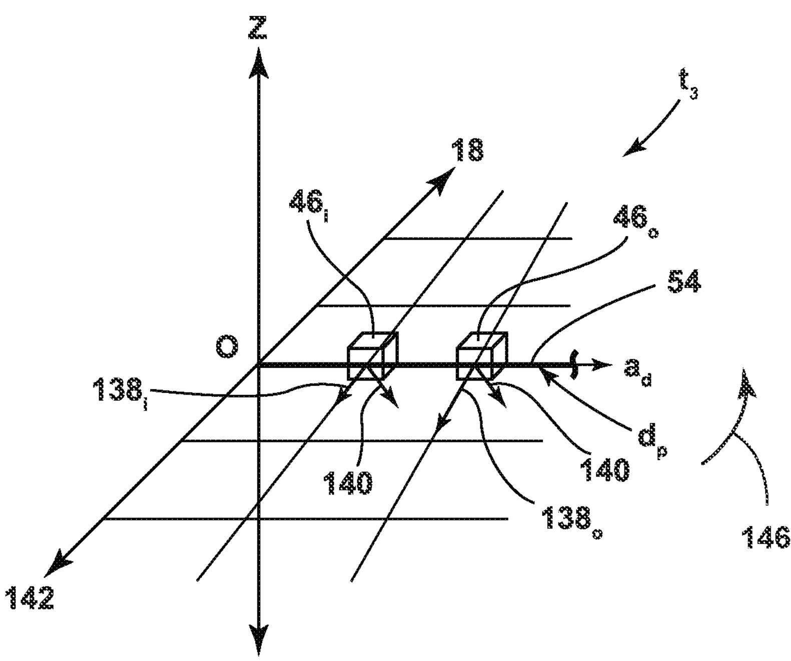
FIG. 8A is a schematic illustration of a first nozzle assembly and a second nozzle assembly positioned along a boom assembly at a third time in accordance with aspects of the present subject matter.
Figure 8B:
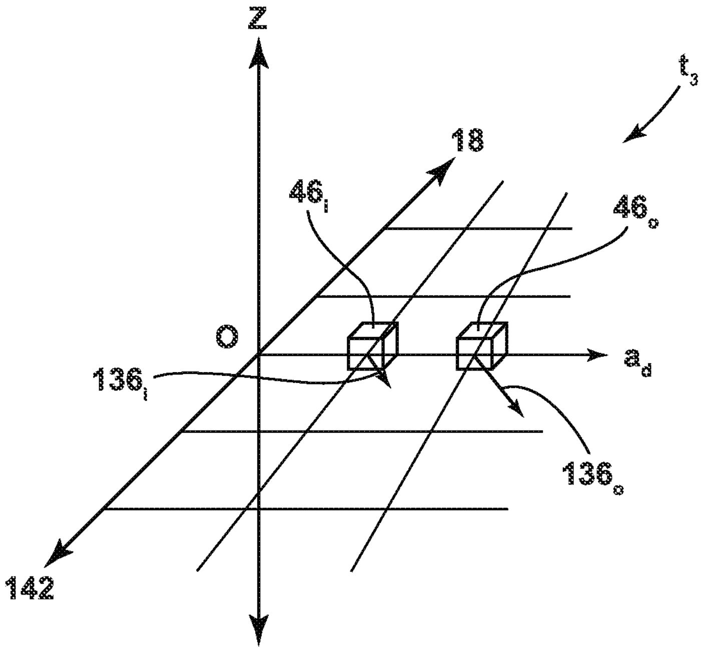
FIG. 8B is a schematic illustration of a first nozzle vector associated with the first nozzle assembly and a second nozzle vector associated with the second nozzle assembly at the third time in accordance with aspects of the present subject matter.

Referring further to FIGS. 8A and 8B, at the third time $t_3$, the work vehicle 10 can move in the direction of travel 18 with the boom arm 54 moving from a position aft of the default axis $a_d$ to the default axis $a_d$ as indicated by arrow 146. In such instances, when the first nozzle assembly 46$_i$ and the second nozzle assembly 46$_o$ are generally aligned with the default axis $a_d$, the first nozzle assembly airflow vector 136$_i$ associated with the first nozzle assembly 46$_i$ may be generally similar in direction to the second nozzle assembly airflow vector 136$_o$ associated with the second nozzle assembly 46$_o$. However, due to the second nozzle assembly 46$_o$ approaching the default axis $a_d$ at a greater speed than the first nozzle assembly 46$_i$, the magnitude of the first nozzle assembly airflow vector 136$_i$ may be varied from the second nozzle assembly airflow vector 136$_o$.

As illustrated in FIG. 8A, the first movement airflow vector 138$_i$ may be oriented in a direction that is generally opposite from the direction of movement of the work vehicle 10 due to the movement direction of the work vehicle 10 and the movement direction of the second nozzle assembly 46$_o$. In addition, the magnitude of the first movement airflow vector 138$_i$ may be based on the speed of the work vehicle 10 relative to the ground surface 20 and the speed of the nozzle assembly 46$_i$, 46$_o$ relative to the chassis 12 of the work vehicle 10. In some instances, as the boom approaches the default axis $a_d$ from a position aft thereof, the first movement airflow vector 138$_i$ may be a combination of the airflow created by the movement of the work vehicle 10 and the movement of the boom arm 54 at least in part in a common direction relative to the default axis $a_d$.

Similarly, the second movement airflow vector 138$_o$ may be oriented in a direction that is generally opposite from the direction of movement of the work vehicle 10 due to the movement direction of the work vehicle 10 and the movement direction of the second nozzle assembly 46$_o$. In addition, the magnitude of the second movement airflow vector 138$_o$ may be based on the speed of the work vehicle 10 relative to the ground surface 20 and the speed of the nozzle assembly 46$_i$, 46$_o$ relative to the chassis 12 of the work vehicle 10. In some instances, as the boom approaches the default axis $a_d$ from a position aft thereof, the second movement airflow vector 138$_o$ may be a combination of the airflow created by the movement of the work vehicle 10 and the movement of the boom arm 54 at least in part in a common direction relative to the default axis $a_d$. As illustrated, the second movement airflow vector 138$_o$ may have a magnitude that is greater than the first movement airflow vector 138$_i$ due to the second nozzle assembly 46$_o$ approaching the default axis $a_d$ at a greater speed than the first nozzle assembly 46$_i$. As such, the magnitude of the first nozzle assembly airflow vector 136$_i$ may be varied from the second nozzle assembly airflow vector 136$_o$. In addition, the environmental airflow vector 140 may be indicative of a speed and direction of airflow generated by environmental factors, which for illustrative purposes is generally equal in direction and magnitude to the other times (e.g., $t_1$, $t_2$, $t_4$, $t_5$) in FIGS. 6A-10B.

With further reference to FIG. 8B, the first nozzle assembly airflow vector 136$_i$ is a combination of the first movement airflow vector 138$_i$ and the environmental airflow vector 140 associated with the first nozzle assembly 46$_i$ illustrated in FIG. 8A. Likewise, the second nozzle assembly airflow vector 136$_o$ is a combination of the second movement airflow vector 138$_o$ and the environmental airflow vector 140 associated with the second nozzle assembly 46$_o$ illustrated in FIG. 8A. As illustrated, the first movement airflow vector 138$_i$ may have a direction that is generally parallel to the second movement airflow vector 138$_o$. In addition, due to the varying speeds of the first nozzle assembly 46$_i$ from the second nozzle assembly 46$_o$ relative to the ground surface 20, the magnitude of the first movement airflow vector 138$_i$ may be varied from the magnitude of the second movement airflow vector 138$_o$. For instance, the magnitude of the first nozzle assembly airflow vector 136$_i$ may be less than the second nozzle assembly airflow vector 136$_o$.

Figure 9A:
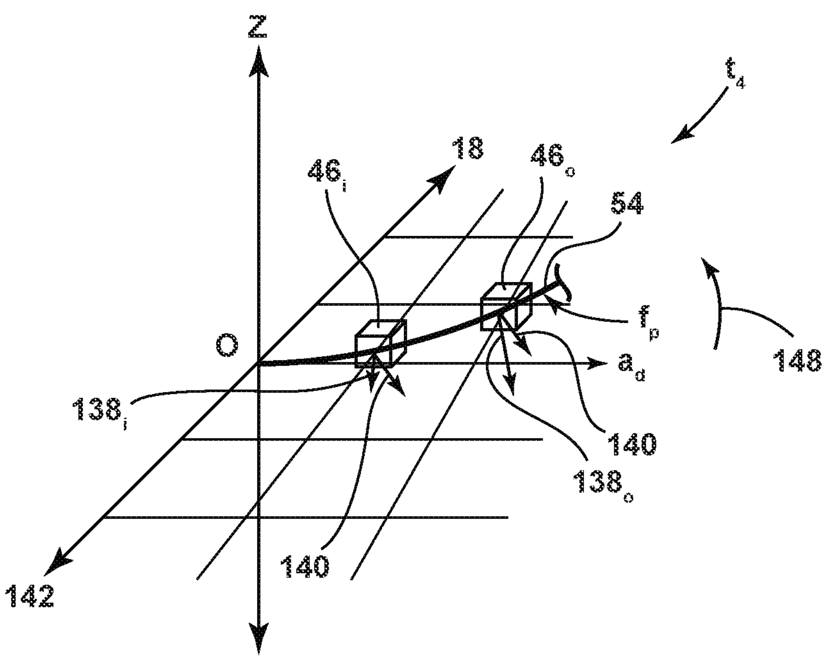
FIG. 9A is a schematic illustration of a first nozzle assembly and a second nozzle assembly positioned along a boom assembly at a fourth time in accordance with aspects of the present subject matter.
Figure 9B:
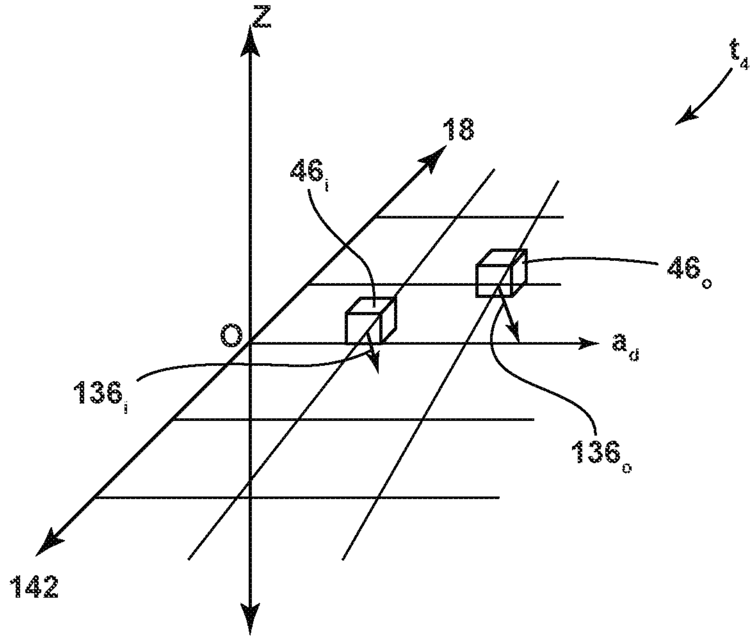
FIG. 9B is a schematic illustration of a first nozzle vector associated with the first nozzle assembly and a second nozzle vector associated with the second nozzle assembly at the fourth time in accordance with aspects of the present subject matter.

Referring further to FIGS. 9A and 9B, at the fourth time $t_4$, the work vehicle 10 can move in the direction of travel 18 with the boom arm 54 moving from the default axis $a_d$ to a position fore of the default axis $a_d$ as indicated by arrow 148. In such instances, the first nozzle assembly airflow vector 136$_i$ associated with the first nozzle assembly 46$_i$ may be non-parallel to the second nozzle assembly airflow vector 136$_o$ associated with the second nozzle assembly 46$_o$ due to the deflection of the boom arm 54. As provided herein, due to the second nozzle assembly 46$_o$ being further from the chassis 12 of the work vehicle 10, the second nozzle assembly 46$_o$ may deflect a greater magnitude from the default axis $a_d$ than the first nozzle assembly 46$_i$. In addition, as the deflection of the first nozzle assembly 46$_i$ and the second nozzle assembly 46$_o$ occurs in a common amount of time, the second nozzle assembly 46$_o$ can move at a greater speed or acceleration than the first nozzle assembly 46$_i$.

As illustrated in FIG. 9A, the movement airflow vectors 138$_i$, 138$_o$ may be oriented in a direction that is generally offset from the direction of movement of the work vehicle 10 as the boom arm 54 is non-perpendicular to the direction of movement of the work vehicle 10. In addition, the magnitude of the movement airflow vectors 138$_i$, 138$_o$ may be based on the speed of the work vehicle 10 relative to the ground surface 20 and the speed of the nozzle assembly 46$_i$, 46$_o$ relative to the chassis 12 of the work vehicle 10. In some instances, as the boom arm 54 is deflected in a direction that is similar to the direction of movement of the work vehicle 10, the movement airflow vectors 138$_i$, 138$_o$ may be a combination of the airflow created by the movement of the work vehicle 10 and the movement of the boom arm 54 in a similar direction (e.g., the direction of movement 18). In addition, the environmental airflow vector 140 may be indicative of a speed and direction of airflow generated by environmental factors, which for illustrative purposes is generally equal in direction and magnitude to the other times (e.g., $t_1$, $t_2$, $t_3$, $t_5$) in FIGS. 6A-10B.

With further reference to FIG. 9B, the first nozzle assembly airflow vector 136$_i$ is a combination of the first movement airflow vector 138$_i$ and the environmental airflow vector 140 associated with the first nozzle assembly 46$_i$ illustrated in FIG. 9A. Likewise, the second nozzle assembly airflow vector 136$_o$ is a combination of the second movement airflow vector 138$_o$ and the environmental airflow vector 140 associated with the second nozzle assembly 46$_o$ illustrated in FIG. 9A. As illustrated, the first nozzle assembly airflow vector 136$_i$ may have a direction that is non-parallel to the second nozzle assembly airflow vector 136$_o$. In addition, due to the varying speeds of the first nozzle assembly 46$_i$ from the second nozzle assembly 46$_o$ relative to the ground surface 20, the magnitude of the first nozzle assembly airflow vector 136$_i$ may be varied from the magnitude of the second nozzle assembly airflow vector 136$_o$.

Figure 10A:
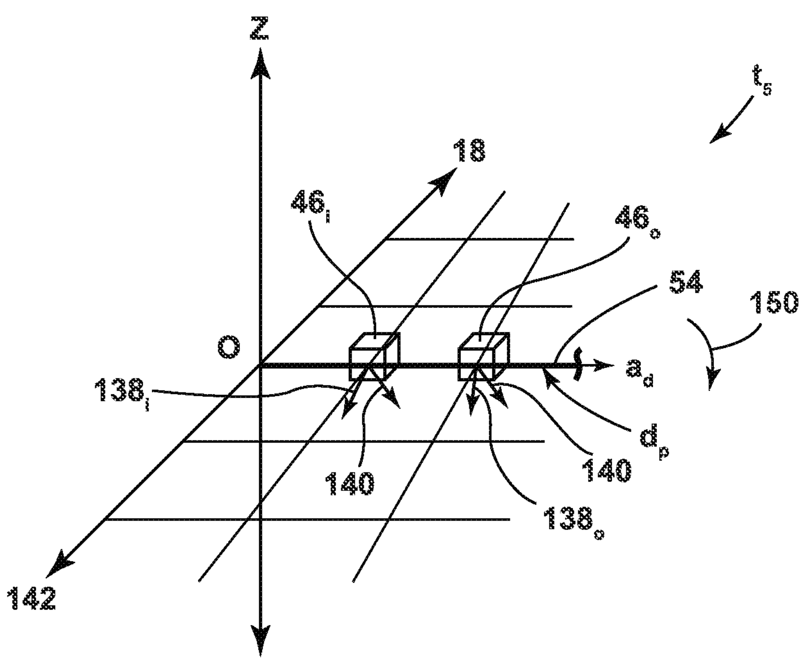
FIG. 10A is a schematic illustration of a first nozzle assembly and a second nozzle assembly positioned along a boom assembly at a fifth time in accordance with aspects of the present subject matter.
Figure 10B:
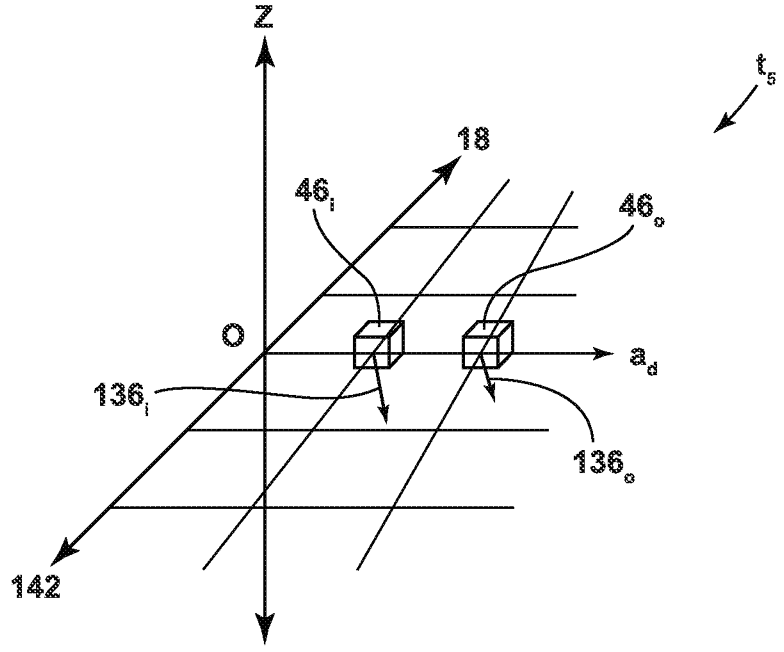
FIG. 10B is a schematic illustration of a first nozzle vector associated with the first nozzle assembly and a second nozzle vector associated with the second nozzle assembly at the fifth time in accordance with aspects of the present subject matter.

Referring further to FIGS. 10A and 10B, at the fifth time $t_5$, the work vehicle 10 can move in the direction of travel 18 with the boom arm 54 moving from a position fore of the default axis $a_d$ to the default axis $a_d$ as indicated by arrow 150. In such instances, when the first nozzle assembly 46$_i$ and the second nozzle assembly 46$_o$ are generally aligned with the default axis $a_d$, the first nozzle assembly airflow vector 136$_i$ associated with the first nozzle assembly 46$_i$ may be generally similar in direction to the second nozzle assembly airflow vector 136$_o$ associated with the second nozzle assembly 46$_o$. However, due to the second nozzle assembly 46$_o$ approaching the default axis $a_d$ at a greater speed than the first nozzle assembly 46$_i$, the magnitude of the first nozzle assembly airflow vector 136$_i$ may be varied from the second nozzle assembly airflow vector 136$_o$.

As illustrated in FIG. 10A, the first movement airflow vector 138$_i$ may be oriented in a direction that is generally opposite from the direction of movement of the work vehicle 10 due to the movement direction of the work vehicle 10 and the movement direction of the first nozzle assembly 46$_i$. In addition, the magnitude of the first movement airflow vector 138$_i$ may be based on the speed of the work vehicle 10 relative to the ground surface 20 and the speed of the nozzle assembly 46$_i$, 46$_o$ relative to the chassis 12 of the work vehicle 10. In some instances, as the boom approaches the default axis $a_d$ from a position fore thereof, the first movement airflow vector 138$_i$ may be a combination of the airflow created by the movement of the work vehicle 10 and the movement of the boom arm 54 at least in part in opposing directions relative to the default axis $a_d$.

Similarly, the second movement airflow vector 138$_o$ may be oriented in a direction that is generally opposite from the direction of movement of the work vehicle 10 due to the movement direction of the work vehicle 10 and the movement direction of the second nozzle assembly 46$_o$. In addition, the magnitude of the second movement airflow 138$_o$ vector may be based on the speed of the work vehicle 10 relative to the ground surface 20 and the speed of the nozzle assembly 46$_i$, 46$_o$ relative to the chassis 12 of the work vehicle 10. In some instances, as the boom approaches the default axis $a_d$ from a position fore thereof, the second movement airflow vector 138$_o$ may be a combination of the airflow created by the movement of the work vehicle 10 in the direction of movement 18 and the movement of the boom arm 54 at least in part in the opposite direction 142. As illustrated, the second movement airflow vector 138$_o$ may have a magnitude that is less than the first movement airflow vector 138$_i$ due to the second nozzle assembly 46$_o$ approaching the default axis $a_d$ at a greater speed than the first nozzle assembly 46$_i$ in a direction 142 opposite from the direction of travel 18. In addition, the environmental airflow vector 140 may be indicative of a speed and direction of airflow generated by environmental factors, which for illustrative purposes is generally equal in direction and magnitude to the other times (e.g., $t_1$, $t_2$, $t_3$, $t_4$) in FIGS. 6A-10B.

With further reference to FIG. 10B, the first nozzle assembly airflow vector 136$_i$ is a combination of the first movement airflow vector 138$_i$ and the environmental airflow vector 140 associated with the first nozzle assembly 46$_i$ illustrated in FIG. 10A. Likewise, the second nozzle assembly airflow vector 136$_o$ is a combination of the second movement airflow vector 138$_o$ and the environmental airflow vector 140 associated with the second nozzle assembly 46$_o$ illustrated in FIG. 8A. As illustrated, the first movement airflow vector 138$_i$ may have a direction that is generally parallel to the second movement airflow vector 138$_o$. In addition, due to the varying speeds of the first nozzle assembly 46$_i$ from the second nozzle assembly 46$_o$ relative to the ground surface 20, the magnitude of the first movement airflow vector 138$_i$ may be varied from the magnitude of the second movement airflow vector 138$_o$. For instance, the magnitude of the first nozzle assembly airflow vector 136$_i$ may be greater than the second nozzle assembly airflow vector 136$_o$.

Referring back to FIGS. 6A-10B, during operation, the first nozzle assembly airflow vector $\mathbf{136}_i$ may be generally similar in direction and/or magnitude to the second nozzle assembly airflow vector $\mathbf{136}_o$ during some periods. Conversely, the first nozzle assembly airflow vector $\mathbf{136}_i$ may be varied in direction and/or magnitude to the second nozzle assembly airflow vector $\mathbf{136}_o$ during other periods. Whether similar or varied, the first nozzle assembly airflow vector $\mathbf{136}_i$ and the second nozzle assembly airflow vector $\mathbf{136}_o$ may contribute positively or negatively to the calculated spray quality index. As such, the system 100 described herein may utilize a nozzle assembly airflow vector associated with one or more nozzle assemblies $\mathbf{46}_i$, $\mathbf{46}_o$ to determine a spray quality index. In addition, when the spray quality index deviates from a defined range, the system 100 may utilize the nozzle assembly airflow vectors to correct the deviation. The correction may be in the form of various control functions. For example, the system 100 may provide notifications and/or instructions to the user interface 32, the vehicle notification system 128, and/or the remote electronic device 132. The notifications and/or instructions may include one or more corrective measures for altering the system 100 to return the spray quality index to a state within the defined range. Additionally or alternatively, the system 100 may be capable of altering a system or component of the vehicle 10 in response to the spray quality index varying from the defined range. For instance, in some embodiments, the system 100 may adjust an agricultural product application system 44 by altering a flow rate of one or more nozzle assemblies $\mathbf{46}_i$, $\mathbf{46}_o$ based at least in part on the airflow vector associated with the one or more nozzle assemblies $\mathbf{46}_i$, $\mathbf{46}_o$. Additionally or alternatively, in some examples, the system 100 may deactivate a pump of the product system 38 thereby pausing application of the agricultural product in response to determining that a threshold number of airflow vectors exceeds a defined range and/or for any other reason. Additionally or alternatively, the system 100 may adjust or alter the powertrain control system 22, the steering system 126, and/or the vehicle suspension 48 when the spray quality index deviates from the defined range.

Figure 11:
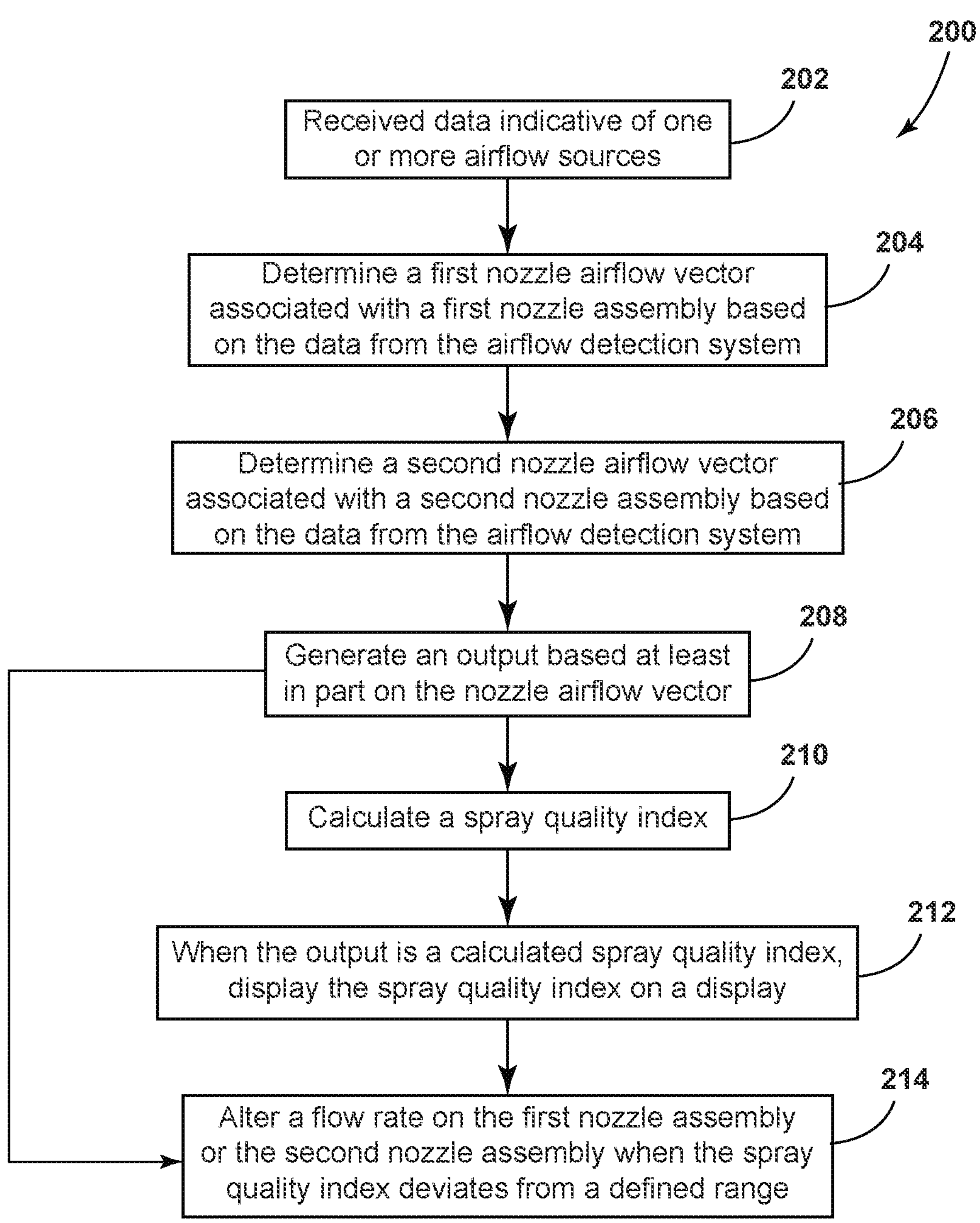
FIG. 11 illustrates a flow diagram of a method for an agricultural application operation in accordance with aspects of the present subject matter.

Referring now to FIG. 11, a flow diagram of some embodiments of a method 200 for operating an agricultural applicator is illustrated in accordance with aspects of the present subject matter. In general, the method 200 will be described herein with reference to the work vehicle 10 and the system 100 described above with reference to FIGS. 1-10B. However, the disclosed method 200 may generally be utilized with any suitable agricultural work vehicle 10 and/or may be utilized in connection with a system having any other suitable system configuration. In addition, although FIG. 11 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 11, at (202), the method 200 can include receiving data indicative of one or more airflow sources through an airflow detection system, which may include a boom deflection airflow, a work vehicle movement airflow, an environmental airflow, etc. In various examples, the airflow detection system can include a first nozzle sensor configured to capture data indicative of one or more airflow sources associated with the first nozzle assembly and a second nozzle sensor configured to capture data indicative of one or more airflow sources associated with the second nozzle assembly. Additionally or alternatively, the airflow detection system can include a position sensor positioned along the boom assembly that is configured to capture data indicative of a deflection of the boom assembly.

At (204), the method 200 can include determining a first nozzle assembly airflow vector associated with a first nozzle assembly supported on a boom assembly based on the data from the airflow detection system with a computing system. At (206), the method 200 can include determining a second nozzle assembly airflow vector associated with a second nozzle assembly supported on the boom assembly based on the data from the airflow detection system with the computing system.

At (208), the method 200 includes generating an output based at least in part on the nozzle assembly airflow vector with the computing system. As provided herein, the output can include a calculating a spray quality index in which the spray quality index represents a metric indicative of a spray operation coverage of a portion of a field at (210). In such instances, the method 200, at (212), can include displaying the spray quality index on a display. The display may be within and/or remote from the work vehicle.

Additionally or alternatively, at (214), the method 200 can include altering a flow rate of the first nozzle assembly or the second nozzle assembly when the spray quality index deviates from a defined range.

Figure 12:
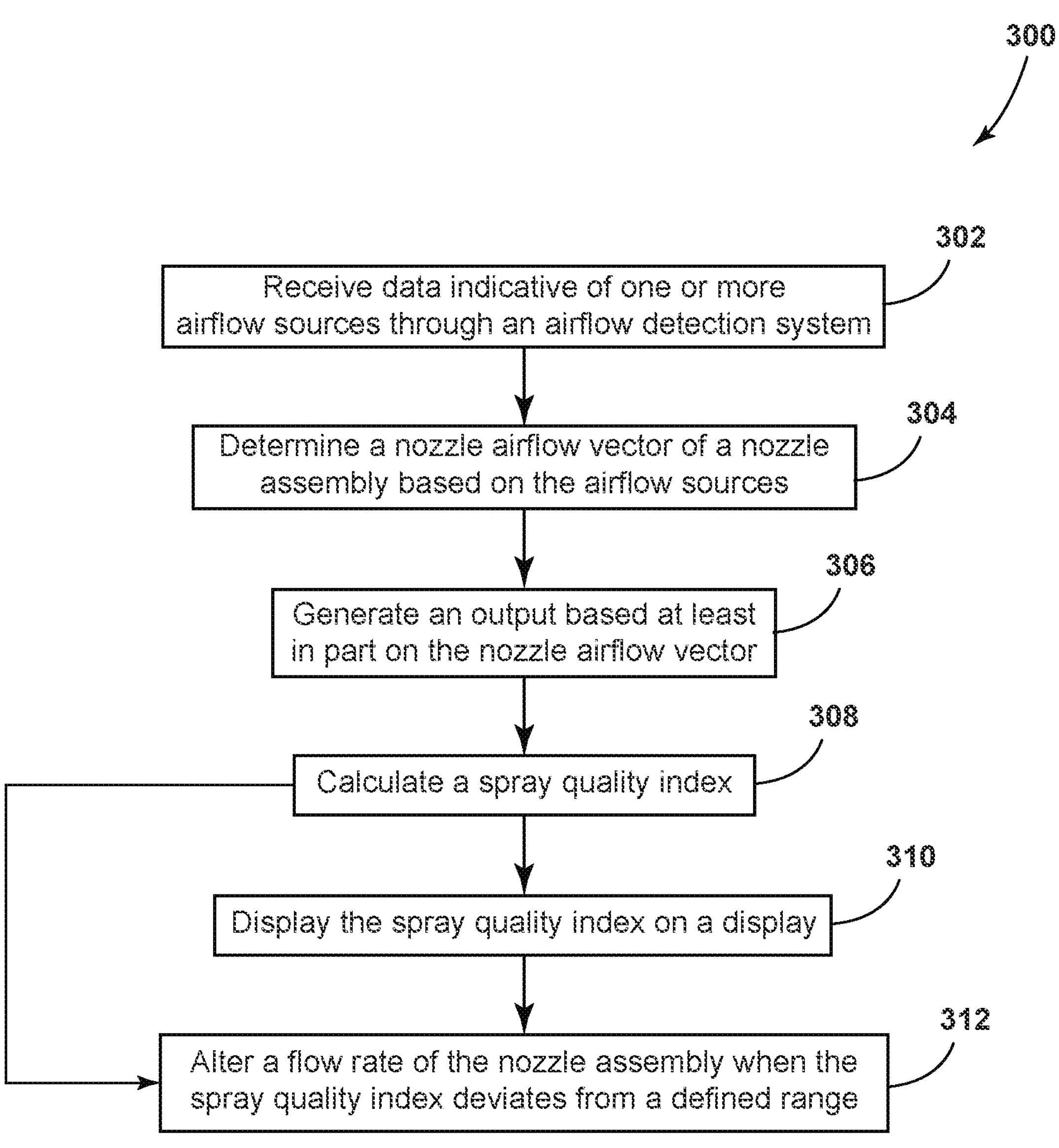
FIG. 12 illustrates a flow diagram of a method for an agricultural application operation in accordance with aspects of the present subject matter.

Referring now to FIG. 12, a flow diagram of some embodiments of a method 300 for an agricultural application operation is illustrated in accordance with aspects of the present subject matter. In general, the method 300 will be described herein with reference to the work vehicle 10 and the system 100 described above with reference to FIGS. 1-10B. However, the disclosed method 300 may generally be utilized with any suitable agricultural work vehicle 10 and/or may be utilized in connection with a system having any other suitable system configuration. In addition, although FIG. 12 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As illustrated, at (302), the method 300 can include receiving data indicative of one or more airflow sources through an airflow detection system, which may include a boom deflection airflow, a work vehicle movement airflow, an environmental airflow, etc. In various examples, receiving data indicative of one or more airflow sources can include receiving data from one or more nozzle sensors associated with the nozzle assembly. Additionally or alternatively, receiving data indicative of one or more airflow sources can include receiving data from one or more position sensors positioned on a boom assembly At (304), the method 300 can include determining a nozzle assembly airflow vector of a nozzle assembly based on the airflow sources with a computing system. In some instances, determining the nozzle assembly airflow vector based on the airflow sources can include generating a boom deflection model based on the data from the position sensors, calculating a movement airflow vector based at least in part on the boom deflection model, calculating an environmental airflow vector based on data from a weather station, and determining the nozzle assembly airflow vector based on the movement airflow vector and the environmental airflow vector.

At (306), the method 300 can include generating an output based at least in part on the nozzle assembly airflow vector with the computing system. As provided herein, the output can include a calculating a spray quality index in which the spray quality index represents a metric indicative of a spray operation coverage of a portion of a field at (308). In such instances, the method 300, at (310), can include displaying the spray quality index on a display. The display may be within and/or remote from the work vehicle.

Additionally or alternatively, at (312), the method 300 can include altering a flow rate of the nozzle assembly when the spray quality index deviates from a defined range.

In various examples, the methods 200, 300 may implement machine learning methods and algorithms that utilize one or several vehicle learning techniques including, for example, decision tree learning, including, for example, random forest or conditional inference trees methods, neural networks, support vector machines, clustering, and Bayesian networks. These algorithms can include computer-executable code that can be retrieved by the computing system and/or through a network/cloud and may be used to evaluate and update the boom deflection model. In some instances, the vehicle learning engine may allow for changes to the boom deflection model to be performed without human intervention.

It is to be understood that the steps of any method disclosed herein may be performed by a computing system upon loading and executing software code or instructions which are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as any of the disclosed methods, may be implemented in software code or instructions which are tangibly stored on a tangible computer-readable medium. The computing system loads the software code or instructions via a direct interface with the computer-readable medium or via a wired and/or wireless network. Upon loading and executing such software code or instructions by the controller, the computing system may perform any of the functionality of the computing system described herein, including any steps of the disclosed methods.

The term "software code" or "code" used herein refers to any instructions or set of instructions that influence the operation of a computer or controller. They may exist in a computer-executable form, such as vehicle code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An agricultural system comprising:

a first nozzle assembly positioned along a boom assembly and configured to selectively dispense an agricultural product therefrom;

an airflow detection system configured to capture data indicative of one or more airflow sources;

a position sensor positioned along the boom assembly, the position sensor configured to capture data indicative of a deflection of the boom assembly in a fore-aft direction; and a computing system communicatively coupled to the first nozzle assembly, the airflow detection system, and the position sensor, the computing system being configured to:

receive, from the airflow detection system, the data associated with the one or more airflow sources;

generate a first nozzle assembly vector for the first nozzle assembly based on the data captured from the airflow detection system and a deflection of the boom assembly as detected by the position sensor, wherein the first nozzle assembly vector is a combination of an environmental vector and a movement airflow vector, the movement airflow vector defined as a combination of a boom deflection airflow caused by movement of a boom arm relative to a chassis of a work vehicle and a work vehicle movement airflow caused by the movement of the work vehicle relative to a ground surface at the first nozzle assembly, and wherein a magnitude of the first nozzle assembly vector is based on a magnitude of deflection in the fore-aft direction of the first nozzle assembly relative to a default position;

calculate a spray quality index based on the first nozzle assembly vector; and alter a flow rate of the first nozzle assembly based on a deviation from a defined range by the spray quality index.

2. The system of claim 1, wherein the first nozzle assembly vector represents a speed and direction of airflow proximate to the first nozzle assembly.

3. The system of claim 1, wherein the airflow detection system comprises one or more nozzle sensors configured to capture data indicative of the one or more airflow sources associated with the first nozzle assembly.

4. The system of claim 1, further comprising:

a weather station configured to provide data indicative of an environmental airflow source.

5. The system of claim 1, further comprising:

a second nozzle assembly positioned along the boom assembly and configured to selectively dispense the agricultural product therefrom, wherein the computing system is communicatively coupled to the second nozzle assembly and is further configured to generate a second nozzle assembly vector for the second nozzle assembly based at least in part on the data captured from the airflow detection system.

6. The system of claim 5, wherein the first nozzle assembly vector is varied from the second nozzle assembly vector in direction or magnitude when the boom assembly is deflected from a default axis.

7. An agricultural system comprising:

a first nozzle assembly positioned along a boom assembly and configured to selectively dispense an agricultural product therefrom;

a second nozzle assembly positioned along the boom assembly and laterally offset from the first nozzle assembly along the boom assembly, the second nozzle assembly configured to selectively dispense an agricultural product therefrom;

an airflow detection system configured to capture data indicative of one or more airflow sources;

a position sensor positioned along the boom assembly, the position sensor configured to capture data indicative of a deflection of the boom assembly in a fore-aft direction; and a computing system communicatively coupled to the first nozzle assembly, to the second nozzle assembly, the airflow detection system, and the position sensor, the computing system being configured to:

receive, from the airflow detection system, the data associated with the one or more airflow sources;

generate a first nozzle assembly vector for the first nozzle assembly based on the data from the airflow detection system and a deflection of the boom assembly as detected by the position sensor, wherein a magnitude of the first nozzle assembly vector is based on a magnitude of deflection in the fore-aft direction of the first nozzle assembly relative to a default position, wherein the first nozzle assembly vector is a combination of an environmental vector and a first movement airflow vector, the first movement airflow vector defined as a combination of a boom deflection airflow caused by movement of a boom arm relative to a chassis of a work vehicle and a work vehicle movement airflow caused by the movement of the work vehicle relative to a ground surface at the first nozzle assembly, the environmental vector defined by a direction and a speed of airflow caused by environmental or ambient factors;

generate a second nozzle assembly vector for the second nozzle assembly based on the data from the airflow detection system and a deflection of the boom assembly as detected by the position sensor, wherein a magnitude of the second nozzle assembly vector is based on a magnitude of deflection in the fore-aft direction of the second nozzle assembly relative to the default position, wherein the second nozzle assembly vector is a combination of an environmental vector and a second movement airflow vector, the second movement airflow vector defined as a combination of the boom deflection airflow caused by movement of the boom arm relative to the chassis of the work vehicle and the work vehicle movement airflow caused by the movement of the work vehicle relative to the ground surface at the second nozzle assembly, the environmental vector defined by the direction and the speed of airflow caused by environmental or ambient factors, and wherein the first movement airflow vector is different from the second airflow movement vector; and alter a flow rate of the first nozzle assembly based on the first nozzle assembly vector for the first nozzle assembly or the second nozzle assembly based on the second nozzle assembly vector for the second nozzle assembly.

8. The system of claim 7, wherein the computing system is further configured to:

pause an application of the agricultural product from the first nozzle assembly the second nozzle assembly in response to determining that a threshold number of nozzle assembly vectors exceeds a defined range.

9. An agricultural system comprising:

a user interface;

a first nozzle assembly positioned along a boom assembly and configured to selectively dispense an agricultural product therefrom;

an airflow detection system configured to capture data indicative of one or more airflow sources, wherein the airflow detection system comprises one or more nozzle sensors configured to capture data indicative of the one or more airflow sources associated with the first nozzle assembly;

a position sensor positioned along the boom assembly, the position sensor configured to capture data indicative of a deflection of the boom assembly in a fore-aft direction; and a computing system communicatively coupled to the first nozzle assembly, the user interface, the airflow detection system, and the position sensor, the computing system being configured to:

receive, from the airflow detection system, the data associated with the one or more airflow sources;

generate a first nozzle assembly vector for the first nozzle assembly based on the data from the airflow detection system and a deflection of the boom assembly as detected by the position sensor, wherein a magnitude of the first nozzle assembly vector is based on a magnitude of deflection in the fore-aft direction of the first nozzle assembly relative to a default position, wherein the magnitude of deflection in the fore-aft direction of the first nozzle assembly is determined based on a lateral position of the first nozzle assembly along the boom assembly the data from the position sensor, the magnitude of deflection characterized by a known position of the first nozzle assembly in the fore-aft direction relative to a default axis; and alter a flow rate of the first nozzle assembly based on the magnitude of the first nozzle assembly vector.

10. The system of claim 9, wherein the first nozzle assembly vector represents a speed and direction of airflow proximate to the first nozzle assembly.

11. The system of claim 9, further comprising:

a weather station configured to provide data indicative of an environmental airflow source.

12. The system of claim 9, wherein the computing system is further configured to calculate a spray quality index based at least in part on the first nozzle assembly vector, the spray quality index representing a metric indicative of a spray operation coverage of a portion of a field.

13. The system of claim 9, further comprising:

a second nozzle assembly positioned along the boom assembly and configured to selectively dispense the agricultural product therefrom, wherein the computing system communicatively coupled to the second nozzle assembly and is further configured to generate a second nozzle assembly vector for the second nozzle assembly based at least in part on the data from the airflow detection system.

14. The system of claim 13, wherein the first nozzle assembly vector is varied from the second nozzle assembly vector in direction or magnitude when the boom assembly is deflected from a default axis.

15. The system of claim 14, wherein the airflow detection system also comprises one or more second nozzle sensors configured to capture data indicative of the one or more airflow sources associated with the second nozzle assembly.

* * * * *